United States Patent
Rieber

(10) Patent No.: US 12,106,097 B2
(45) Date of Patent: Oct. 1, 2024

(54) USING HARDWARE-ACCELERATED INSTRUCTIONS

(71) Applicant: Robert Bosch GmbH, Stuttgart (DE)

(72) Inventor: Dennis Sebastian Rieber, Albstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 282 days.

(21) Appl. No.: 17/649,322

(22) Filed: Jan. 28, 2022

(65) Prior Publication Data

US 2022/0276865 A1 Sep. 1, 2022

(30) Foreign Application Priority Data

Feb. 19, 2021 (DE) ...................... 10 2021 201 597.2

(51) Int. Cl.
*G06F 9/30* (2018.01)
*G06F 8/41* (2018.01)
*G06F 17/16* (2006.01)

(52) U.S. Cl.
CPC .............. *G06F 9/3001* (2013.01); *G06F 8/45* (2013.01); *G06F 9/30036* (2013.01); *G06F 17/16* (2013.01)

(58) Field of Classification Search
CPC ...... G06F 9/3001; G06F 8/45; G06F 9/30036; G06F 17/16; G06F 8/433; G06F 8/452;
(Continued)

(56) References Cited

U.S. PATENT DOCUMENTS

| 7,523,445 B1 * | 4/2009 | Geller ...................... G06N 5/04 706/19 |
| 2004/0088689 A1 * | 5/2004 | Hammes ................. G06F 8/447 717/154 |

(Continued)

FOREIGN PATENT DOCUMENTS

EP 2876555 A1 * 5/2015 ........... G06F 8/4452

OTHER PUBLICATIONS

M. Sotoudeh et al. "ISA Mapper: A Compute and Hardware Agnostic Deep Learning Compiler" Proceedings of the 2nd SysML Conference, Palo Alto, CA, USA, 2019. Retrieved from the Internet on Jan. 28, 2022. https://arxiv.org/abs/1810.09958. 11 Pages.

(Continued)

*Primary Examiner* — Farley Abad
(74) *Attorney, Agent, or Firm* — NORTON ROSE FULBRIGHT US LLP; Gerard A. Messina

(57) ABSTRACT

A computer-implemented method of implementing a computation using a hardware-accelerated instruction of a processor system by solving a constraint satisfaction problem. A solution to the constraint satisfaction problem represents a possible invocation of the hardware-accelerated instruction in the computation. The constraint satisfaction problem assigns nodes of a data flow graph of the computation to nodes of a data flow graph of the instruction. The constraint satisfaction problem comprises constraints enforcing that the assigned nodes of the computation data flow graph have equivalent data flow to the instruction data flow graph, and constraints restricting which nodes of the computation data flow graph can be assigned to the inputs of the hardware-accelerated instruction, with restrictions being imposed by the hardware-accelerated instruction and/or its programming interface.

18 Claims, 5 Drawing Sheets

(58) Field of Classification Search
CPC . G06F 8/41; G06F 5/06; G06F 9/4451; G06F 9/4843; G06F 9/30156; G06F 9/3016; G06F 9/3824; G06N 3/0464; G06N 3/063
See application file for complete search history.

(56) References Cited

U.S. PATENT DOCUMENTS

| | | | |
|---|---|---|---|
| 2015/0074652 A1* | 3/2015 | Chockler | G06F 11/3608 717/126 |
| 2019/0278593 A1* | 9/2019 | Elango | G06F 9/30065 |
| 2021/0055700 A1* | 2/2021 | Ududec | G06Q 50/06 |
| 2022/0229641 A1* | 7/2022 | Meister | G06N 3/08 |

OTHER PUBLICATIONS

T. Moreau et al., "A Hardware-Software Blueprint for Flexible Deep Learning Specialization" 2019, Retrieved from the Internet on Jan. 28, 2022: https://arxiv.org/abs/1807.04188. 7 Pages.
Wikipedia "Constraint-Satisfaction-Problem" 2020, 2 Pages.

* cited by examiner

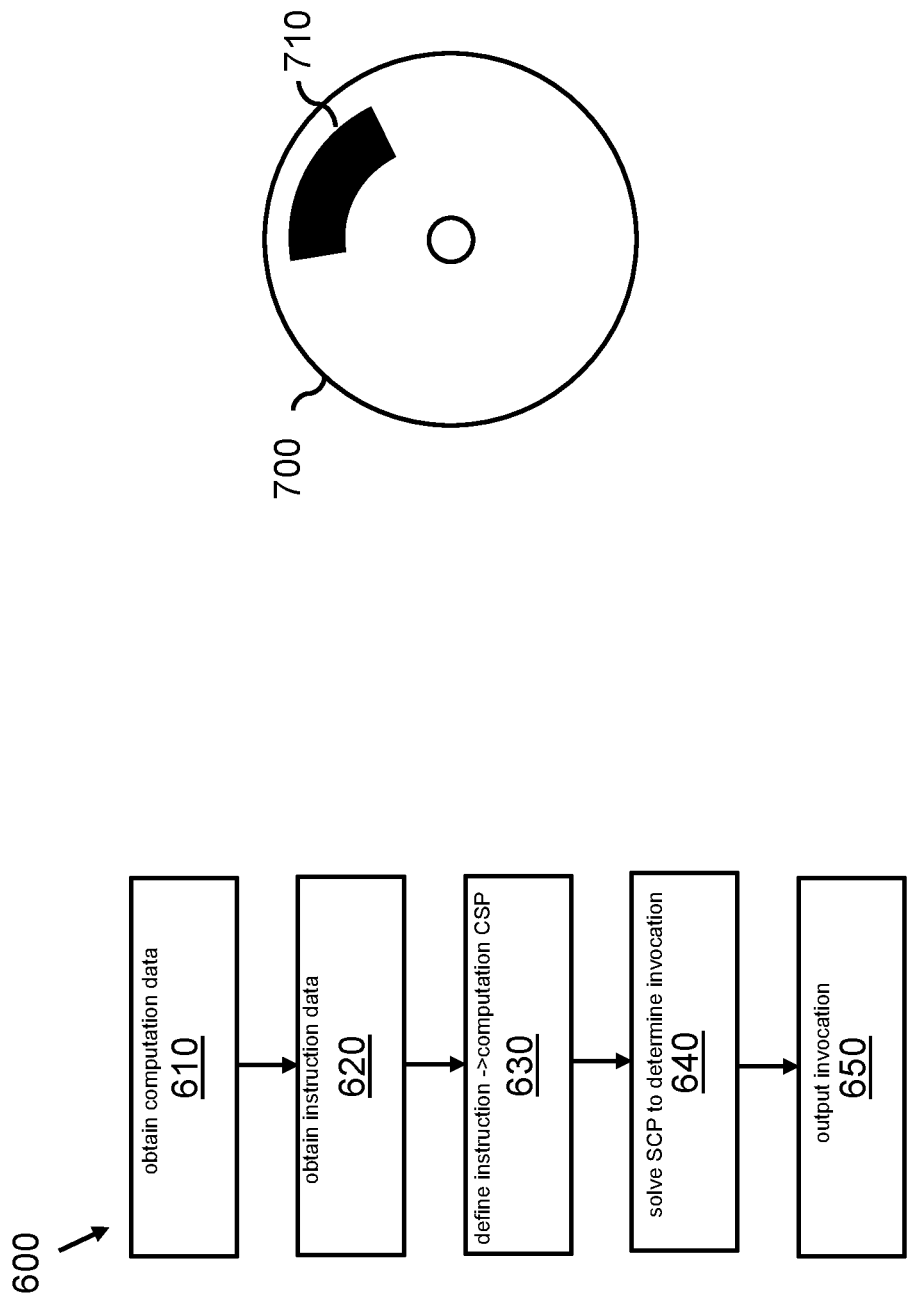

USING HARDWARE-ACCELERATED INSTRUCTIONS

CROSS REFERENCE

The present application claims the benefit under 35 U.S.C. § 119 of German Patent Application No. 10 2021 201 597.2 filed on Feb. 19, 2021, which is expressly incorporated herein by reference in its entirety.

FIELD

The present invention relates to a computer-implemented method of implementing a computation using a hardware-accelerated instruction of a processor system, and to a corresponding system. The present invention further relates to a computer-readable medium comprising instructions to perform the above method and/or instructions implementing the computation using the hardware-accelerated instruction.

BACKGROUND INFORMATION

With ever increasing amounts of data being collected and processed, it is becoming more and more important to efficiently implement large computations. One field in which the need to process large amounts of data is especially prevalent is machine learning. For example, the evaluation but especially also the training of neural networks, such as deep neural networks (DNN), involves the evaluation of large numbers of matrix multiplications, convolutions, dot products, and similar operations. There is a large and continuously evolving variety of DNN architectures tailored to particular applications.

In order to speed up such computations, more and more specialized hardware is becoming available. Such hardware involves hardware accelerators that are optimized to perform particular instructions, such as matrix multiplications or convolutions, efficiently. Thus use of such hardware-accelerated instructions allow computations to be implemented more efficiently, in particular in resource-constrained settings.

To make use of hardware-accelerated instructions, it is important to provide compiler techniques to translate code in higher-level programming languages into machine-executable instructions that invoke the hardware-accelerated instruction. This is particularly important since both the computations to be performed and the hardware architectures to perform them on are continuously evolving. It is however a complex task to automatically determine how to implement computations, such as those relating to evaluations of neural network layers, such that they make the most effective use of hardware-accelerated instructions. One of the reasons why this task is so complex, is that hardware-accelerated instructions can have complex dataflows that may involve hundreds or thousands of parallel and sequential operations over multi-dimensional input and output arrays.

In the paper "ISA Mapper: A Compute and Hardware Agnostic Deep Learning Compiler" by M. Sotoudeh et al. (incorporated herein by reference), techniques are presented to perform code generation onto an instruction set that includes a matrix multiplication instruction. A deep learning computation kernel and hardware capabilities are described by an intermediate representation that works on a loop-level representation of operators.

Instruction mapping is applied to determine the possible ways a computation can be performed on a hardware system. In this instruction mapping, a number of "IR transformations" are applied to the computation, after which a "deterministic mapper" attempts to, at a loop level, map the transformed computation to the hardware instructions. A scheduler chooses a specific mapping. To manage the large search space of mappings and schedules, heuristics, cost models, and potentially machine learning are used.

SUMMARY

One disadvantage of existing techniques to implement computations using hardware-accelerated instructions, is that the use of a loop-level representation of operators introduces implicit implementation decisions like loop and tensor ordering or access function notation. For example, a tensor access function for a stencil in an operator may be x*stride+w, whereas an accelerator may offer an instruction with access function i+k. For stride=1 a match is possible, but it is hard to automatically establish such matches in general, e.g., by pattern matching. Thus, possible implementations may be missed.

Also the reliance of existing techniques on an explicitly specified set of IR transformations is disadvantageous. It is difficult to directly detect a specific sequence of transformations that leads to an embedding. Ultimately, this can lead to a non-deterministic search process where many different implementation candidates need to be generated. Also, the more transformations are added, the more the search space is increased, with diminishing returns on the number solutions. Thus, there is a tension between the exploration needed to find the optimal implementation, and search space restrictions needed to find a solution in a reasonable amount of time. Moreover, even if a large set of transformations are used, it remains possible that a subclass of implementations is hidden behind an unavailable transformation.

Due to these disadvantages, existing techniques may fail to find an implementation of a computation that makes the most effective use of a hardware-accelerated instruction. In some cases, existing techniques may even fail to find out how the hardware-accelerated instruction can be used in the computation at all. It is thus desirable to have techniques that can find more possible implementations of a computation using a hardware-accelerated instruction. It is also desirable to have techniques that can find such implementations more efficiently.

In accordance with a first aspect of the present invention, a computer-implemented method and a corresponding system are provided for implementing a computation using a hardware-accelerated instruction of a processor system. In accordance with another aspect of the invention, a computer-readable medium is provided.

Various measures of the present invention are directed to implementing a computation using a hardware-accelerated instruction of a processor system. By implementing the computation using the hardware-accelerated instruction, it is meant that a possible invocation of the instruction in the computation is found, in other words, that a part of the computation is found that can be performed by invoking the instruction. The determined invocation may be used to automatically generate machine-executable instructions that implement the computation and that invoke the hardware-accelerated instruction according to the determined possible invocation, e.g., to compile the computation into executable code, but this is not needed. Finding the possible invocation by itself is already useful, e.g., for use in manually implementing the computation; for determining whether such an implementation is possible at all; or for use by another system that performs the actual compilation.

The computation and the hardware-accelerated instruction may be represented by respective data flow graphs. Nodes of the data flow graphs may represent inputs and operations of the computation or instruction, with edges representing data flow relations between the nodes, e.g., incoming edges of an operation may be used to represent values that the operation acts on. The hardware-accelerated instruction typically performs a predefined operation with a fixed dataflow, e.g., the instruction data flow graph may be fixed. The operations are typically scalar operations, e.g., operations that are applied to individual numerical or non-numerical elements.

Interestingly, the inventors realized that the problem of determining a possible invocation of the hardware-accelerated instruction in the computation, may be phrased as a constraint satisfaction problem that assigns nodes of the computation data flow graph to nodes of the instruction data flow graph. Thus, a solution of the constraint satisfaction problem may assign nodes of the computation data flow graph, e.g., operations or inputs of the computation, to nodes of the instruction data flow graph, e.g., operations or inputs of the hardware-accelerated instruction. Such an assignment is also referred to herein as a "mapping" of the instruction data flow graph to the computation data flow graph. Effectively, instead of finding a possible invocation in a top-down approach by transforming the computation and then mapping the computation to the hardware instruction, a bottom-up approach is proposed in which, by finding a solution to the constraint satisfaction problem, a mapping from the instruction to the computation may be progressively constructed.

The constraint satisfaction problem may be defined such that a solution to the constraint satisfaction problem represents a possible invocation of the hardware-accelerated instruction in the computation. To this end, the constraint satisfaction problem may comprise at least two types of constraint, referred to as data flow constraints and input constraints.

The data flow constraints may enforce that the nodes of the computation data flow graph that are assigned to the nodes of the instruction data flow graph, have an equivalent data flow to the instruction data flow graph. For example, the hardware-accelerated instruction is mapped to a part of the computation that corresponds to the functionality of the hardware-accelerated instruction. In particular, performing the operations of the instruction data flow graph on the values of the computation that the inputs of the instruction data flow graph are mapped to, according to the data flow relations indicated by the instruction data flow graph, may lead to the same computation result as performing the operations of the computation data flow that these operations are mapped to. One way of enforcing this is by enforcing that the subgraph of the computation data flow graph that the instruction data flow graph is mapped to, is isomorphic to the instruction data flow graph itself, although relaxations of this requirement are possible.

As the inventors realized, however, in order for a mapping from the instruction data flow graph to the computation data flow graph to represent a possible invocation of the hardware-accelerated instruction, in many cases it is not sufficient to just use data flow constraints. This is because the hardware-accelerated instruction and/or its programming interface usually impose additional restrictions regarding the values of the computation that the instruction can be applied to. For example, the hardware-accelerated instruction may require its inputs to be organized according to a particular memory layout, and/or to be accessed according to a particular access pattern. To represent such requirements, the constraint satisfaction problem may also include one or more input constraints that restrict which nodes of the computation data flow graph can be assigned to the inputs of the hardware-accelerated instruction. Thus, a possible invocation may be an invocation that it is compatible with the restrictions imposed by the hardware-accelerated instruction and/or its programming interface.

Interestingly, by defining possible invocations in terms of a constraint satisfaction problem, it is enabled to determine a possible invocation by solving the constraint satisfaction problem. Techniques for this are conventional. The data flow and input constraints may guarantee that the invocation is possible. It is not needed to first apply a transformation to the full computation and then try out if the transformed computation can be implemented using the hardware-accelerated instruction, which may be inefficient. Instead, the mapping representing the invocation of the hardware-accelerated instruction can be progressively constructed by the constraint solver, with the constraints guaranteeing that the solution is a possible invocation. It is also not needed to define an explicit set of code transformations, which can be very difficult or impossible to get complete.

Since the mapping is performed on an operation level, as opposed, e.g., to a loop level, and since any mapping satisfying the constraints may be found by the constraint solver, implicit implementation decisions such as loop ordering, memory layout and memory access functions, can be avoided. In particular, invocations can be determined with a memory layout that is more flexible than that provided by conventional approaches based on a predefined set of transformations. Experiments on benchmarks show that this increased flexibility in practice allows to find better-performing invocations than conventional techniques. Thus, a wide range of possible invocations of the hardware-accelerated instruction can be found, and this can be done in a more efficient, e.g., computationally less expensive, way. Those, more effective invocations of the hardware-accelerated instruction can be found, or invocations can even be found for computations where this was previously not feasible.

A further advantage of using a constraint solver to find possible invocations, is that it is possible to separate requirements that a possible invocation needs to satisfy, from preferences that are considered beneficial. In particular, by adapting the variable selection strategy and/or value selection strategy applied by the constraint solver, it is possible to have control over the solution space during the constraint solving, but without affecting what it means for a solution to be valid. By controlling the constraint solver, it is possible to guide the constraint solver to find particular solutions first. Thus, the quality of the determined possible invocations can be improved, and it is possible to further improve the efficiency of the constraint solver by effectively suggesting parts of potential solutions to try out, without however discarding parts of the solution space: if the suggestions do not lead to a solution, the constraint solver can continue to consider other possible solutions.

Optionally, machine-executable instructions may be generated implementing the computation. These instructions may invoke the hardware-accelerated instruction according to the determined possible invocation. This way, an efficient implementation of the computation making use of the hardware-accelerated instruction may be obtained. Thus, a method of compiling a computation into machine-executable instructions may be provided.

Optionally, the computation and instruction data flow graph may comprise nodes representing scalar operations. E.g., a scalar operation may act on a fixed number of one or more separate values (usually, one or two) and outputs a fixed number of one or more separate values (usually, one). Thus, the constraint satisfaction problem may map scalar operations to scalar operations, as opposed to acting at a loop level. In some embodiments, each node of the graphs may represent a scalar operation, with the possible exception of commutative reduction operations as described elsewhere. As also explained elsewhere, by performing the mapping at a scalar level, implicit modelling assumptions that can otherwise restrict which invocations can be found are minimized, allowing better-performing invocations to be identified.

Optionally, the hardware-accelerated instruction may implement one or more of a matrix multiplication, a convolution, a dot product, a matrix-vector product, a cumulative sum, a pooling, and a Hadamard product. These are common operations that are performed repeatedly in large computations, and for which hardware acceleration is available, so optimizing them is particularly relevant.

Generally, the computation is a computation that comprises operations that are expected to be implementable by the hardware-accelerated instruction. For example, the computation can be a sub-computation of a larger computation, such as the application of a convolution operator in a neural network evaluation, that is manually selected for as being potentially amenable to application of the hardware-accelerated instruction. In terms of data flow, there may be many different ways in which the instruction may be invoked in the computation, but only some of these ways may adhere to the restrictions imposed by the hardware-accelerated instruction and/or its programming interface, and those possible invocations may differ greatly in terms of performance. Thus, it is important to automatically be able to find and/or enumerate the possible invocations.

Optionally, the instruction data flow graph may include nodes for only a subset of outputs of the hardware-accelerated instruction. Other outputs of the hardware-accelerated instruction, as well as operations used to compute those other outputs, may be left out, making the constraint satisfaction problem more efficient to solve. A determined possible invocation may then be generalized to the full computation performed by the instruction based on the determined possible invocation. For example, for a matrix multiplication instruction, a data flow graph of a computation of a single output element may be sufficient to extrapolate to inputs and outputs of the full matrix multiplication. A subset of outputs of may be selected that uses all inputs of the hardware-accelerated instruction, so that the possible invocation maps all inputs, making the extrapolation easier; or also the mapping of instruction inputs to the computation may be extrapolated.

Optionally, the computation may be a computation applied in a neural network evaluation. For example, the computation may comprise a convolution, a matrix multiplication, and/or a pooling operation being applied, e.g., to a neural network layer input. The computation may touch each node of the neural network layer input. Neural network evaluation is an operation that occurs both during training and during use of a neural network, and involves repeatedly applying operations that are amenable to hardware acceleration, such as matrix multiplication, and so is a particularly relevant optimization target. Moreover in terms of data flow there are many ways in which these operations can be applied. In particular, for neural network training to be effective, it is typically needed to train the neural network on large datasets; whereas evaluation of neural networks often takes place in resource-constrained environments. In both cases, optimization is of particular importance. Moreover, given the large variety and constant development of neural network layers and acceleration hardware, it is particularly important to be able to obtain implementations of new types of neural network layer and/or for new hardware targets.

Optionally, at least part of the computation may be specified by a polyhedral representation. A polyhedral representation may symbolically define a set of nodes of the computation data flow graph. When solving the constraint satisfaction problem, the polyhedral representation may be instantiated to obtain a concrete note of this set of nodes, and a node of the instruction data flow graph may then be mapped to this obtained node.

Polyhedral representations are conventionally used as a way of compactly representing loop-based programs. Interestingly, the inventors realized that in addition to modelling loops of a loop-based program, the polyhedral representation can be used to model the data flow as well. Determining an invocation by directly translating polyhedral representations into each other is undesirable, for example, because the representation represents modelling assumptions like loop or tensor dimension ordering, and because doing so may require defining explicit transformations of the representations, with the associated disadvantages described elsewhere. Interestingly, by using the polyhedral representation of a computation data flow graph to which an instruction data flow graph is to be mapped, these disadvantages are avoided.

In combination with the present techniques, the polyhedral representation may be used to symbolically define sets of polyhedral of the computation data flow graph. Interestingly, however, the mapping between the instruction data flow graph and the computation data flow graph may still be performed not in terms of sets of nodes, e.g., sets of operations, but in terms of individual nodes, e.g., individual operations. The polyhedral notation may avoid that the full computation data flow graph needs to be stored; only those individual elements that are mapped to from the instruction data flow graph need to be instantiated. In many cases this greatly reduces computational and memory complexity.

The polyhedral representation is typically not used to represent the computation data flow graph, or at least a polyhedral representation of it is not used during the constraint solving. The polyhedral nodes of the computation data flow graph are typically stored individually as variables of the constraint satisfaction problem.

Optionally, the one or more input constraints may be defined to enforce that inputs of the hardware-accelerated instruction have an allowed memory layout and/or memory access pattern. Generally, the hardware-accelerated instruction and/or its programming interface may enforce that the inputs that the instruction applied to, are stored in memory according to a certain arrangement, e.g., that the inputs form a consecutive block of memory, the memory addresses are aligned in a certain way, etc. These are examples of memory layout requirements that restrict to which inputs the hardware-accelerated instruction can be applied. These requirements may be represented as input constraints to make sure they are adhered to. Similarly, the hardware-accelerated instruction may support a given set of access patterns according to which the instruction can be applied, e.g., whether the inputs are accessed according to a given stride, a given stencil pattern, etc. This way, it can be further limited to which inputs the hardware-accelerated instruction can be applied.

It is also possible to include memory layout and/or memory access pattern restrictions relating to intermediate results and outputs of the hardware-accelerated instruction in the set of constraints e.g. to represent instructions imposed by the instruction and/or its programming interface.

Optionally, one or more constraints may be defined enforcing that pairs of mutually parallelizable operations of the hardware-accelerated instruction are mapped to pairs of mutually parallelizable operations of the computation. Pairs may be marked as being mutually parallelizable, e.g., by including a special type of edge indicating parallelizability to the data flow graphs. Although it is not necessary to explicitly mark pairs of operations as being mutually parallelizable and enforce this in the mapping, doing so is beneficial for the performance of the constraint solving, because it allows the solving process to directly eliminate potential assignments in which mutually parallelizable operations are not mapped to mutually parallelizable operations.

Interestingly, the inventors realized that for a set of operations of the instruction data flow graph that are all mutually parallelizable, it is not needed to include parallelizability constraints for each separate pair. Including the constraint for only a subset of pairs improves the performance of the solver, since the solver's efficiency generally scales in the number of constraints; and also a subset helps the solver to eliminate assignments. Moreover, by transitivity, enforcing parallelizability constraints for a set of pairs of the instruction data flow graph may imply that parallelizability constraints for each pair in the transitive closure are also satisfied. In the computation data flow graph, parallelizability can be indicated for each pair of operations in a set of mutually parallelizable operations, in order not to needlessly limit which assignments can be made. For the computation data flow graph this may impose less of a performance penalty, especially if this graph is not fully instantiated during the solving e.g. due to the use of a polyhedral representation.

Optionally, a node of the instruction data flow graph may represent a commutative reduction operation. For example, a node for a commutative reduction operation, e.g., sum or product, may represent this operation being applied to all incoming edges of the node. The use of such nodes can greatly reduce the number of nodes and edges needed to specify common hardware-accelerated operations, such as matrix multiplication or convolution, without impacting the correctness of the data flow graphs as representations of the computation or instruction. It also allows a more flexible mapping, since the graph does not specify a particular order in which the elements need to be reduced. Although commutative reduction operations may be implicitly defined, e.g., by the node having more than two incoming edges, it is preferred to explicitly mark nodes as representing a commutative reduction operation. For example, this can be done by including a self-edge in the graph. Such explicit marking can make it more efficient for the constraint solver to determine mappings for commutative reduction operations.

The data flow constraints may enforce that nodes representing commutative reduction operations of the instruction data flow graph are mapped to corresponding nodes of the computation data flow graph. A corresponding nodes may be a node representing a commutative reduction operation of the computation, e.g., a node having incoming edges for each element on which the commutative reduction operation acts. However, this is not needed. It is also possible to represent individual reductions of the overall reduction operation separately in the instruction data flow graph. In such cases, the node of the instruction data flow graph may be mapped to a node representing an individual reduction. This can make it easier to model computations since no separate modelling effort for commutative reduction operations is needed.

Optionally, in solving the constraint satisfaction problem, a variable selection strategy may be used that propagates backwards through the instruction data flow graph. It was observed in practice that for the type of constraint satisfaction problem defined by data flow and input constraints, using this variable selection strategy has the most propagation potential and thus is generally most efficient in finding solutions. This was found to be the case in particular for computations of neural network layer evaluations.

Optionally, the constraint satisfaction problem may be defined to allow mapping of operations of the hardware-accelerated instruction to dummy operations that do not affect the computation, e.g., that lead to the same computation result. Solving the constraint satisfaction problem may comprise mapping a node to a dummy operation, e.g., a node may be mapped to an operation that is not comprised in the computation data flow graph, or multiple nodes may be mapped to the same node of the computation data flow graph. By allowing dummy operations, flexibility in finding possible invocations is increased. In particular, it can allow to apply the hardware-accelerated instruction on workloads that are otherwise not be executable by the instruction. For example, a relevant part of the computation may be smaller than the hardware-accelerated instruction, e.g., only a subset of nodes of the instruction data flow graph may be mapped to nodes of the computation data flow graph. For example, the instruction may compute a sum of four elements whereas the computation requires a sum of only three elements. By including dummy operations that do not affect the computation, e.g., adding neutral elements for operations performed by the instruction such as zero for addition or one for multiplication, the relevant part of the computation can still be executed by the hardware-accelerated instruction.

Optionally, one or more constraints may be included in the constraint satisfaction problem enforcing inputs of the hardware-accelerated instruction to form a hyper-rectangle. This constraint allows the constraint solver to rule out a large part of the search space quickly, e.g., already after only a few assignments to instruction data flow nodes have been made. This greatly improves efficiency of the search, and moreover guarantees that regular solutions are provided that can more easily be generalized to obtain invocations for the remainder of the computation. Since in many practical applications, typical invocations of the hardware-accelerated instruction have hyper-rectangle-shaped inputs, these restrictions in such cases do not result in well-performing possible invocations being missed.

Optionally, multiple solutions to the constraint satisfaction problem may be determined. Their performance can then be evaluated, and based on this performance evaluation, a solution from the multiple solutions may be selected. The constraint solver can find possible invocations that satisfy the constraints, but typically does not optimize the found solutions in terms of performance (although the constraint solver may be configured to prioritize certain solutions, as also described herein). However, the constraint solver may be configured to output multiple solutions to the constraint satisfaction problem, or even to enumerate all possible solutions. By evaluating the performance of these multiple solutions, it is possible to select a solution that has desired performance. Various strategies may be employed, e.g., a fixed number of solutions can be determined or a fixed amount of time can be used to find solutions, and the found solutions can then be evaluated; or solutions can be iteratively determined and evaluated until a solution with desirable performance is found or until no further improvement is found in a certain period; etc.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

FIG. 6 shows a computer-implemented method of implementing a computation, in accordance with an example embodiment of the present invention.

FIG. 7 shows a computer-readable medium comprising data, in accordance with an example embodiment of the present invention.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
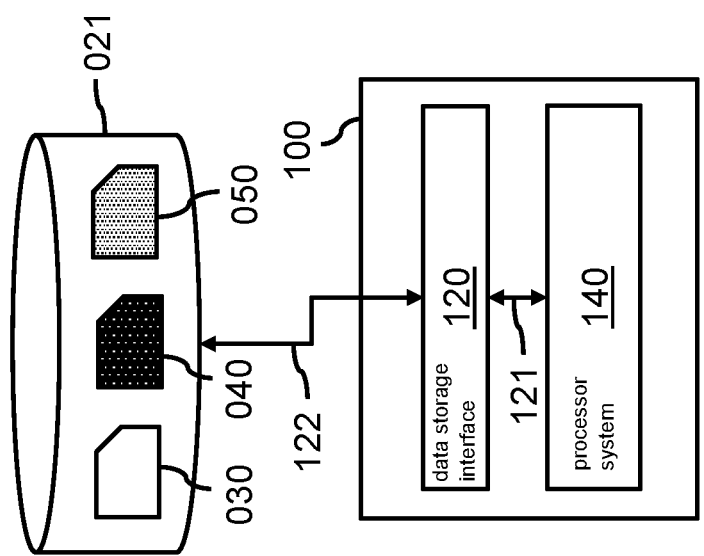
FIG. 1 shows a system for implementing a computation, in accordance with an example embodiment of the present invention.

FIG. 1 shows a system 100 for implementing a computation using a hardware-accelerated instruction of a processor system. For example, the computation may be implemented using processor system 240 of system 200 of FIG. 2, e.g., system 100 may produce instructions executable by processor system 240 or at least determine an invocation of a hardware-accelerated instruction supported by processor system 240 that can be used to perform the computation on processor system 240. Systems 100 and 200 may be combined, e.g., the processor system 140 of system 100 (discussed further below) may support the hardware-accelerated instruction.

The system 100 may comprise a data interface for accessing computation data 030 and instruction data 040. The computation data 030 may define a computation data flow graph representing the computation. A node of the computation data flow graph may represent an input or an operation of the computation. The instruction data 040 may define an instruction data flow graph representing the hardware-accelerated instruction. A node of the instruction data flow graph may represent an input or an operation of the hardware-accelerated instruction.

The instruction data flow graph may have at least 16, at least 32, or at least 128 nodes. The number of nodes may be at most 2048 or at most 4096. The computation data flow graph typically has a larger number of nodes than the instruction data flow graph, e.g., by a factor $2^6=64$, $2^{10}=1024$, or $2^{12}=4096$. The number of nodes of the instruction data flow graph can be at least $2^{16}=65536$, $2^{32}=4294967296$, or $2^{48}$, for example.

For example, as also illustrated in FIG. 1, the data interface may be constituted by a data storage interface 120 which may access the data 030, 040 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fibreoptic interface. The data storage 021 may be an internal data storage of the system 100, such as a hard drive or SSD, but also an external data storage, e.g., a network-accessible data storage. In some embodiments, the data 030, 040 may each be accessed from a different data storage, e.g., via a different subsystem of the data storage interface 120. Each subsystem may be of a type as is described above for data storage interface 120.

The data interface, e.g., data storage interface 120, may also be for accessing a determined possible invocation of the hardware-accelerated instruction or, as shown in the figure, machine-executable instructions 050 implementing the computation by invoking the hardware-accelerated instruction according to a determined possible invocation. These instructions 050 may be for use by a processor system that performs the computation, e.g. processor system 240 of FIG. 2.

The system 100 may further comprise a processor subsystem 140 which may be configured to, during operation of the system 100, obtain the computation data 030 and the instruction data 040.

The processor subsystem 140 may be further configured to, based on the computation data and the instruction data, define a constraint satisfaction problem. A constraint satisfaction problem may be defined by a set of variables, a set of domains, and a set of constraints. By "defining" the constraint satisfaction problem, it is meant that information about the constraint satisfaction problem is made available in a form that allows the constraint satisfaction problem to be solved by a constraint solver. It is not needed for example that sets of variables, domains, and/or constraints are explicitly and individually stored, e.g., they can be defined implicitly and/or evaluated lazily as is conventional. Moreover, part or all of the constraint satisfaction problem may be made available in the form of the computation data 030 and/or the instruction data 040, e.g., the instruction data 040 may comprise or otherwise defined the set of nodes of nodes of the instruction data flow graph and thereby the set of variables of the constraint satisfaction problem.

A solution to the constraint satisfaction problem may represent a possible invocation of the hardware-accelerated instruction in the computation. The constraint satisfaction problem may assign nodes of the computation data flow graph to nodes of the instruction data flow graph. The constraint satisfaction problem may comprise one or more data flow constraints enforcing that the assigned nodes of the computation data flow graph have equivalent data flow to the instruction data flow graph. The constraint satisfaction problem may further comprise one or more input constraints restricting which nodes of the computation data flow graph can be assigned to the inputs of the hardware-accelerated instruction. These latter restrictions may be imposed by the hardware-accelerated instruction and/or its programming interface. The constraints may be defined, e.g., by automatically defining them based on the computation data 030 and/or instruction data 040, by receiving manual definitions of the constraints, or a combination of the two.

The processor subsystem 140 may be further configured to solve the constraint satisfaction problem to determine a possible invocation of the hardware-accelerated instruction in the computation. The processor subsystem may be further configured to output data defining the possible invocation.

The system 100 may further comprise an output interface for outputting data defining the possible invocation, for example, the solution to the constraint satisfaction problem or machine-executable instructions 050 derived from the solution. For example, as also illustrated in FIG. 1, the output interface may be constituted by the data interface 120, with said interface being in these embodiments an input/output ('IO') interface, via which the data may be stored in the data storage 021. In some embodiments, the output interface may be separate from the data storage interface 120, but may in general be of a type as described above for the data storage interface 120. The output interface can also be any other type of output interface, e.g., a network interface.

Figure 2:
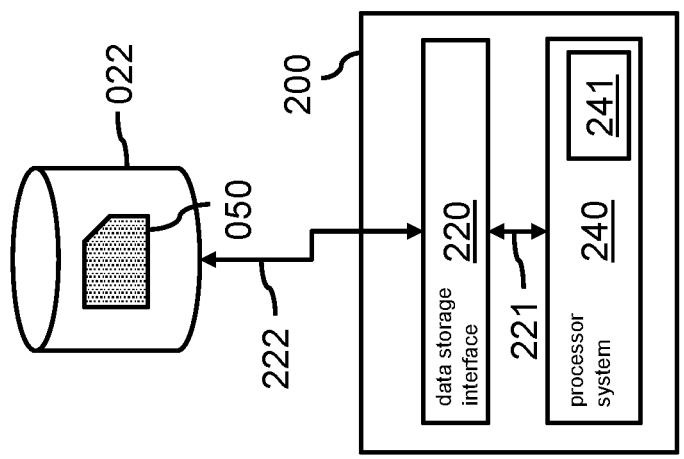
FIG. 2 shows a system for performing a computation using a hardware-accelerated instruction, in accordance with an example embodiment of the present invention.

FIG. 2 shows a system 200 for performing a computation using a hardware-accelerated instruction.

The system 200 may comprise a data interface 220 for accessing instructions 050 for performing the computation. For example, the instructions 050 may be generated by system 100 of FIG. 1, or based on a possible invocation determined by system 100. For example, as also illustrated in FIG. 2, the data interface may be constituted by a data storage interface 220 which may access the instructions 050 from a data storage 022. In general, the data interface 220 and the data storage 022 may be of a same type as described with reference to FIG. 1 for the data interface 120 and the data storage 021.

The system 200 may further comprise a processor subsystem 240. The processor subsystem 240 may support a hardware-accelerated instruction. Generally, a hardware-accelerated instruction is an instruction supported by the processor subsystem 240 that performs a dedicated task. The dedicated task is not an elementary CPU instruction such as scalar addition, scalar multiplication, bitwise, etc. Instead, a single call to the hardware-accelerated instruction may correspond to performing several of these elementary instructions; but executing the hardware-accelerated instruction is typically faster. Executing the hardware-accelerated instruction can improve performance of the computation, e.g., results in decreased latency and/or increased throughput.

The hardware-accelerated instruction typically has multiple scalar inputs (e.g., numerical values such as ints or floats), e.g., at least 4, at least 16, or at least 64. A hardware-accelerated instruction can have a single output (e.g., a numerical value such as an int or a float), but can have multiple such outputs as well, e.g., at least 4, at least 16, or at least 64. The hardware-accelerated instruction may correspond to a certain number N of elementary CPU instructions. For example, an elementary CPU instruction may correspond to a node of the instruction data flow graph. Thus, N may be equal to the number of nodes of the instruction data flow graph, or, if the instruction data flow graph models only part of the instruction, N may be larger. For example, N may be at least $2^{12}$=4096, at least $2^{16}$=65536, or at least $2^{24}$=16777216.

Generally, the processor subsystem 240 may be embodied by a single Central Processing Unit (CPU), but also by a combination or system of such CPUs and/or other types of processing units. The hardware-accelerated instruction can be supported by the processor system 240 in various ways. In some embodiments, the hardware-accelerated instruction is an instruction of the CPU of processor subsystem 240, e.g., the hardware-accelerated instruction may be implemented on-chip. In some embodiments, as illustrated in the figure, the hardware-accelerated instruction may be executed by a hardware accelerator 241 separate from the CPU, e.g., a specialized processing unit. The hardware accelerator 241 can for example be coprocessor; an application-specific instruction set processor (ASIP); a field-programmable gate array (FPGA); an application-specific integrated circuit (ASIC); a complex programmable logic device (CPLD); or any other type of programmable logic. For example, hardware accelerator 241 can be the VTA accelerator as discussed in T. Moreau et al., "A Hardware-Software Blueprint for Flexible Deep Learning Specialization" (incorporated herein by reference).

The instructions 050 may invoke the hardware-accelerated instruction. Processor subsystem 240 may be configured to perform the computation, comprising invoking the hardware-accelerated instruction according to the instructions 050, e.g., by invoking the hardware accelerator 241. Because a determined possible invocation is used, efficiency of the computation may be improved.

Optionally, the computation may be part of the application of a trained machine learning model, e.g., a deep neural network. The processor subsystem 240 may be configured to obtain an input to the machine learning model, from a sensor via a sensor interface, e.g., an image sensor, a lidar sensor, a radar sensor, a pressure sensor, a contain temperature sensor, etc. The processor subsystem 240 may be configured to apply the machine learning model to the input to obtain an output. Based on the output, control data may be derived and provided to an actuator via an actuator interface, e.g., an electric, hydraulic, pneumatic, thermal, magnetic and/or mechanical actuator. For example, system 200 may be used to control a robot, an autonomous vehicle, and the like.

In general, each system described in this specification, including but not limited to the system 100 of FIG. 1 and the system 200 of FIG. 2, may be embodied as, or in, a single device or apparatus, such as a workstation or a server. The device may be an embedded device. The device or apparatus may comprise one or more microprocessors which execute appropriate software. The examples given in this respect for processor system 240 of FIG. 2 apply to the processor system 140 of FIG. 1 as well. The software run by the processor systems may have been downloaded and/or stored in a corresponding memory, e.g., a volatile memory such as RAM or a non-volatile memory such as Flash. In general, each functional unit of the respective systems 100, 200 may be implemented in the form of a circuit. It will be appreciated that the same considerations and implementation options may in general apply to the system 200 as for the system 100 of FIG. 1, unless otherwise noted.

Figure 4B:
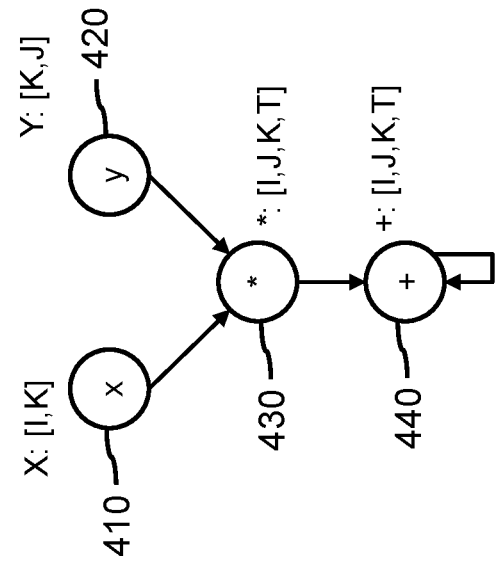
FIG. 4B shows a detailed example of a polyhedral representation that defines a data flow graph, in accordance with an example embodiment of the present invention.
Figure 4A:
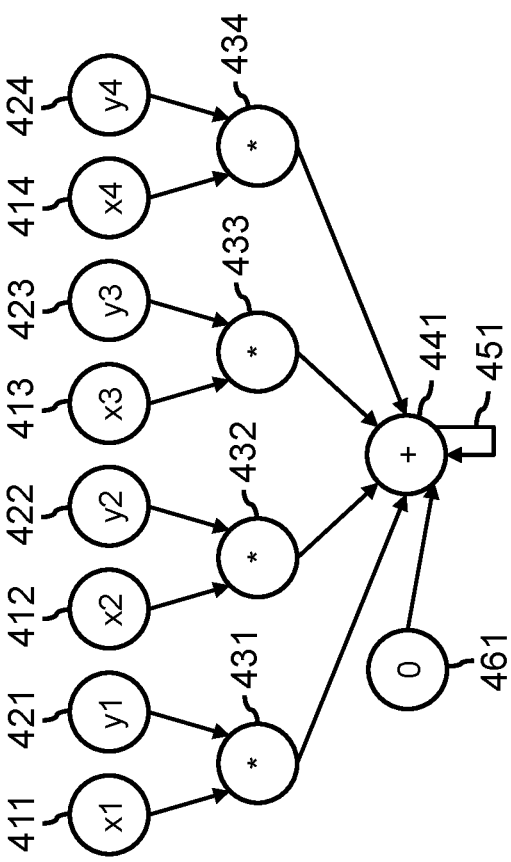
FIG. 4A shows a detailed example of a data flow graph, in accordance with an example embodiment of the present invention.

FIG. 4A shows a detailed, yet non-limiting example of a data flow graph. A data flow is a representation of a computation in terms of operations into which the computation can be subdivided, and data flow relations between these operations. Specifically, the graph may comprise nodes and edges. Nodes may represent inputs and operations of the computation. Edges may represent data flow relations between the nodes. This includes input/output relations (referred to herein as sequential-type edges), but can optionally also include other types of relations. Apart from these nodes and edges, also other nodes and edges may be present in the graph. Data flow graphs are typically directed, e.g., contain at least one directed edge. A data flow graph may be a connected graph, but this is not strictly needed.

For illustration purposes, the figure shows a data flow graph of the computation $\Sigma_{i=1}^{4} x_i \cdot y_i$. For example, this computation occurs as the computation of one output element of a 4×4 matrix multiplication. This example can be used as, or as part of, a computation data flow graph or an instruction data flow graph, for example. Circles represent nodes of the graph. Arrows denote edges of the graph.

One or more nodes of the data flow graph may represent inputs of the computation. These nodes are also referred to herein as data nodes. Typically, data nodes have only outgoing sequential-type edges, e.g., no incoming edges of any type or outgoing edges of other types. The figure shows data nodes 411, 412, 413, and 414, corresponding to respective inputs x1, x2, x3, and x4 of the computation represented by the graph; and data nodes 421, 422, 423, and 424, corresponding to respective inputs y1, y2, y3, y4. The figure shows another input node 461 corresponding to the constant value 0.

One or more nodes of the data flow graph may represent operations of the computation. These nodes are also referred to herein as operation nodes. An operation node may be labelled according to which operation it performs. Although data flow graphs per se can be used to represent any type of operation, typically, operations herein are typically scalar operations, e.g., an operation performed on a fixed number of numerical values (e.g., a scalar addition, a scalar multiplication, a scalar division, a negation) or non-numerical values (e.g., a bitwise AND, a bitwise XOR, a bitwise NOT, etc). For example, a scalar value may be a value with a fixed-size representation in memory, e.g., of at most 256, at most 128, at most 64, or at most 32 bits.

Typically, an operation nodes has one or more incoming sequential edges corresponding to the data that is consumed by the operation. For example, the figure shows an operation node 431, representing a scalar multiplication of inputs x1, 411 and y1, 421; an operation node 432, representing a scalar multiplication of inputs x2, 412, and y2, 422; an operation node 433, representing a scalar multiplication of inputs x3, 413, and y3, 423; and an operation node 434, representing a scalar multiplication of inputs x4, 414, and y4, 424. As in this example, the operation may be a commutative operation, in which case the order of the inputs of the operation is typically not explicitly represented; but it is also possible to represent the order of the inputs, e.g., for non-commutative operations, e.g., by labelling the incoming sequential edges.

Interestingly, an operation node may be used to represent a commutative reduction operation, such as addition or multiplication. For example, node 441 represents an addition of its incoming nodes, operation nodes 431-434 and node 461 representing the initialization value of the operation. Adding a node for the initializing value is optional, e.g., the initializing value may be assumed unless explicitly given to be equal to the neutral element of the operation, e.g., zero or one. An initializing value of the operation may be mapped to an equal initializing value of the computation. Using a single node 441 to represent this operation has several advantages. It alleviates the need to include separate nodes for separate pairwise applications of the operation, e.g., adding values 431, 432; adding value 433 to the result and adding value 434 to that result. This increases efficiency, and also prevents that the data flow graph enforces the addition to be performed in a particular order, e.g., by disallowing to determine the sum by first adding values 433 and 434; then adding value 432; and then adding value 431. Nodes representing commutative reduction operations may be used in an instruction data flow graph, in a computation data flow graph, or both.

As shown in this example, a node may be explicitly marked in the graph as representing a commutative reduction operation. In this example, this is done by adding a self-edge 451 to the node 441. Other ways of marking are also possible, e.g., by labelling the node as representing a commutative reduction operation. This marking has the advantage that it makes it more efficient for the constraint solver to determine mappings for commutative reduction operations, e.g., when choosing to which node to map a commutative reduction operation, the constraint solver may be able to discard nodes that do not have a self-edge more easily than by e.g. attempting to map inputs of the operation.

The use of self-edges to mark commutative reduction operations is particularly convenient in the case where commutative reduction nodes are used in the instruction data flow graph but not in the computation data flow graph. For example, when mapping a commutative reduction node A of the instruction data flow graph to a corresponding node B of the computation data flow graph, the self-edge may be mapped to a corresponding edge of the computation data flow graph between subsequent applications of the reduction operation. Enforcing existence of such a corresponding edge can make it easier to detect the mapping between the two graphs.

An operation node may produce one or more outgoing sequential edges to other operations that use the result of the operation. Nodes that do not have outgoing sequential edges to other operations (but possible outgoing self-edges to itself) may represent outputs of the computation represented by the graph. For example, node 441 may represent an output. Thus, in a data flow graph, an output may be equated with the operation that results in it. It is also possible mark outputs explicitly, e.g., by labelling. Output nodes may be labelled with additional information, e.g., representing a shape and/or a data type of the output, that can be used to match between computations and instructions.

Optionally, pairs of operations of the data flow graph may be marked as being mutually parallelizable. This can be done, e.g., by adding an edge between the pair of nodes (not shown in this figure). Such edges are referred to herein as spatial edges. In particular, spatial edges may be added between nodes that perform the same operation but in a different part of the computation, e.g., for a different output element. Spatial edges can again be used to help the constraint solver map mutually parallelizable operations to mutually parallelizable operations, as described herein.

A reduction in the number of spatial edges, and thus an improvement in efficiency, may be achieved for a set of mutually parallelizable operations by including only a subset of the set of edges. For example, instead of having a set of k nodes fully connected by spatial edges, the number of edges may be reduced by pruning the connections while maintaining the same connected component. For example, a star configuration may be chosen where one internal node is connected by spatial edges to k−1 leaves. By transitivity, parallelizability information may be maintained.

Mathematically, a data flow graph as used herein can for example be formalized as a labelled, directed graph, defined as $G=(N,E,l)$, where N is the set of nodes, the set of directed edges is $E \subseteq N \times N$ and $l()$ is a function assigning labels from the set $L_N \cup L_E \cdot L_N = \{\{Operation\}, \{Data\}\}$ is the set of node label classes, e.g., holding tensor shapes, data types and/or arithmetic operations. $L_E = \{Spatial, Sequential\}$ is the set of edge labels.

In various aspects, a data flow graph referred to as the computation data flow graph may be used to represent a computation. A data flow graph referred to as the instruction data flow graph may be used to represent an instruction. These data flow graphs may represent the full input/output behaviour of the computation or instruction, e.g., including all inputs and outputs of the computation or instruction, and nodes modelling how the outputs follow from the inputs. In some cases, it is also possible to model only a subset of the computation and/or instruction. For example, the instruction data flow graph may represent only operations and/or inputs used for the computation of a subset of its outputs, with the remainder of inputs, operations, and/or outputs being determined by extrapolation, as also described elsewhere.

It is also not needed that operations of the graphs are explicitly performed by the computation or the hardware-accelerated instruction, e.g., an addition and multiplication may be modelled separately in an instruction data flow graph whereas they are performed by the hardware by a combined multiply-and-add. Thus, nodes representing intermediate results of the instruction or computation do not necessarily correspond to values that are explicitly computed or stored at some point during the instruction or computation. The inputs and outputs are typically explicitly computed in an implementation, however.

In various aspects, data is used that defines a data flow graph, e.g., a computation data flow graph or an instruction data flow graph. By "defining" the data flow graph, it is meant that the sets of nodes and edges are derivable from the data, or at least that given a node or edge, it can be determined whether the node or edge belongs to the graph. In particular, it is not necessary that the data itself contains explicit data items corresponding to individual nodes and edges. For example, it is also possible to define sets of nodes and edges symbolically, as also discussed with respect to FIG. 4B, or edges may be defined implicitly, e.g., presence of an edge of a certain type may be defined by the data by giving pairs of nodes that do not have the edge, etc. Various alternatives are possible.

Figure 3:
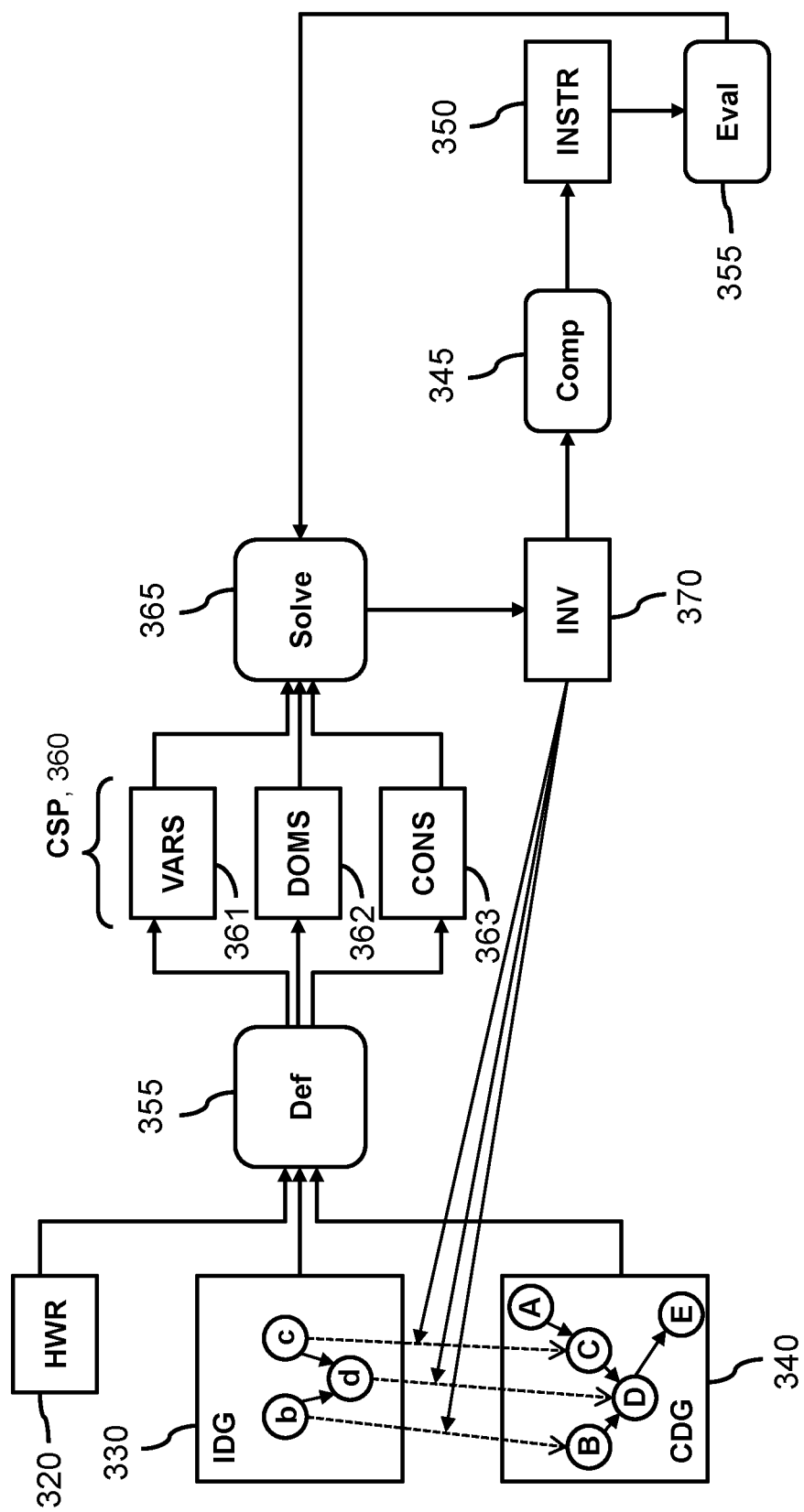
FIG. 3 shows a detailed example of how to implement a computation, in accordance with an example embodiment of the present invention.

FIG. 3 shows a detailed, yet non-limiting example of how to implement a computation using a hardware-accelerated instruction.

Shown in the figure is an instruction data flow graph (DFG) IDG, 330, representing the hardware-accelerated instruction, in other words the functionality or computation that the hardware-accelerated instruction performs. For example, instruction DFG IDG can be as described with respect to FIG. 4A. In particular, nodes of the graph IDG may represent inputs and operations of the hardware-accelerated instruction.

Also shown in the figure is a computation DFG CDG, 340, representing the computation to be implemented using the hardware-accelerated instruction, e.g., as in FIG. 4A. Nodes of the graph CDG may represent inputs and operations of the computation. The instruction data flow graph IDG and the computation data flow CDG graphs are different, e.g., have no common nodes or edges.

The instruction and computation DFGs are two distinct graphs that may each be represented by respective computation and instruction data (not shown). As discussed, this data may implicitly or explicitly define the nodes and edges of the graph, e.g., allow the nodes and edges to be enumerated or at least membership of the sets of nodes and edges to be tested.

The graphs IDG, CDG are generally defined over the same set of operations, e.g., have the same granularity. This makes it easier and thus more efficient to map operations of the two graphs to each other.

In a defining operation Def, 355, the instruction and computation DFGs IDG, CDG, may be used to define a constraint satisfaction problem CSP, 360. A solution to this problem CSP may represent a possible invocation of the hardware-accelerated instruction in the computation.

As is conventional, a constraint satisfaction problem CSP is typically defined by a set of variables VAR, 361; a set of respective domains DOMS, 362, for the respective variables; and a set of constraints CONS, 363. Mathematically, constraint satisfaction problem CSP may be represented by a triple (X,D,C), where:
  $X=\{x_j | 0 \leq j \leq n\}$ is a set of variables, for which the problem is to find a value.
  $D=\{d_j | 0 \leq j \leq n\}$ is the set of value domains, from which values may be assigned to the respective variables. An assignment $Asn(d_j, x_j): x_j = v$ may select a value $v \in d_j$ for a $x_j$ to take. Variable $x_j$ may thus be restricted to take values only from domain $d_j$.
  $C=\{c_i | 0 \leq i \leq m\}$ is the set of constraints. A constraint $c_i$ may be formed over a subset of variables $g_x \subset X$ and evaluates if all assignments $Asn(g_d, g_x)$ with $g_d \subset D$ are valid.

A solution to the constraint satisfaction problem CSP may be an assignment that assigns values to all variables, and where no assignment violates the conjunction of constraints C.

The constraint satisfaction problem CSP may represent the problem of finding possible invocations of the hardware-accelerated instruction in the computation by mapping nodes of the computation data flow graph CDG to nodes of the instruction data flow graph IDG. The set of variables VAR may include a variable for each node of the instruction data flow graph. Each node of the computation data flow graph may be included in a domain DOM for at least one of the variables. The set of constraints CONS may include data flow and input constraints. The number of constraints can be at least 10, at least 100, or at least one, two or five times the number of nodes of the instruction data flow graph, for instance.

Thus, the embedding of the instruction into the computation may effectively be described at a scalar level. Interestingly, every potential assignment between nodes in the instruction and nodes in the computation may be represented as a mapping between nodes of the graph, so the formulation can be used to capture every possible solution to the embedding problem. The matching problem itself is not bound to implicit implementation decisions like loop ordering or memory layout of tensors or access functions. This removes the need for transformations in the search to account for these decisions. Instead, such transformations may be derived these from the result of the embedding.

In particular, a variable may be included in the set of variables VARS for every node of the instruction DFG IDG, e.g., $X=\{x|\forall x \in N_i\}$. Accordingly, every scalar operation and data element in the hardware-accelerated instruction may be represented by a variable. The set of domains DOMS may be defined as $D=\{d|d \subseteq S_d\}$. Here, $S_d$ may include all nodes of the computation DFG CDG or include a subset of the set of all nodes, e.g., the subset of all nodes having the same operation as node d, etc. It is also possible to impose this latter restriction by a constraint, however. The domains may include additional values, e.g., corresponding to dummy operations or inputs.

Given variables VARS and domains DOMS, the set of constraints CONS may be used to represent conditions that an assignment may satisfy in order to represent a possible invocation of the hardware-accelerated instruction.

An important aspect that may be enforced by constraints CONS is that the data flow of the nodes of the instruction data flow graph IDG are equivalent to the data flow of the nodes of the computation data flow graph CDG that they are assigned to. For example, taking the part of the computation flow graph given by the assigned nodes and replacing it by the nodes of the instruction data flow graph, may result in a data flow graph of a computation with the same outputs. Constraints enforcing this equivalence may be referred to as data flow constraints.

In particular, the data flow constraints may enforce that the instruction data flow graph IDG is isomorphic to the subgraph of the computation data flow graph CDG induced by the solution to the constraint satisfaction problem CSP. In this case, replacing the mapped subgraph of the computation data flow graph by the instruction data flow graph may result in a graph that is identical in terms of connections between, and labelling of, nodes. However, strict isomorphism may be relaxed in several ways described herein.

To enforce equivalence, for an edge of the instruction data flow graph, one or more constraints representing its dataflow may be included in the data flow constraints. In mathematical notation, given instruction DFG $G_i=(N_i,E_i,l_i)$ and computation DFG $G_o=(N_o,E_o,l_o)$, the data flow constraints may require that the solution to the constraint satisfaction problem CSP represents an injective function $f:G_i \rightarrow G_o$ that describes a distinct subset of nodes and edges in $G_o$ that matches $G_i$, e.g.: $\forall(s,t) \in E_i \Rightarrow (f(s),f(t)) \in E_o$, and that maintains the labelling, e.g., $\forall s \in N_i: l_i(s)=l_o(f(s))$. Injectivity may be enforced by requiring that every node of the computation data flow graph only exists once in the solution. A global "AllDiff" constraint enforcing this may be included in the data flow constraints.

For example, the following pseudocode may be used to model the dataflow:

```
for (s,t) in E:
    if label(s,t) == sequential:
        edge(s,t,type=sequential)
    else:
        edge(s,t,type=spatial)
AllDiff(N)
```

The data flow constraints may enforce that pairs of mutually parallelizable operations of the hardware-accelerated instruction are mapped to pairs of mutually parallelizable operations of the computation. In this example, this is done by including spatial-type edges in the respective data flow graphs IDG, CDG, and enforcing that spatial edges of the instruction data flow are mapped to spatial edges of the computation data flow graph. As discussed, including a constraint for each pair in a set of mutually parallelizable operations may result in a large number of constraints. The transitive property of the pairwise constraints may be leveraged to avoid this. Instead of enforcing mutual parallelizability for each pair in the set, it may be enforced only for a subset of pairs. In particular, if the subset has the full set as transitive closure, still, parallelizability may be implied for the full set. For example, an arbitrary first node in the instruction DFG may be selected, and a constraint may be added to every parallel node it has. If any node parallel to the first node gets assigned a value, the domain of first node may be pruned to only contain nodes parallel to the assignee. This may propagate to all other node parallel to first node. Thus, the same number of values may be efficiently pruned.

In solving the constraint satisfaction problem CSP, variables VARS may be assigned values from their respective domains DOMS. During the solving, a node of the computation data flow graph CDG may be selected as a possible value for a node of the instruction data flow graph IDG. The constraint solver may apply a so-called propagation algorithm that attempts to assign a value to a variable and checks whether this assignment is allowed by the constraints CONS and/or whether this assignment forces assignments to other variables VARS according to the constraints. The following is an example propagation algorithm for enforcing data flow constraints. Given a node s to which a value is assigned and which has an edge to another node t, this example algorithm checks whether the assignment to s is correct, and what correct values can be assigned to the other node t:

```
if label(s) != l(s.val): # check the variable label against the
        label of the assigned node
    return Failed
# compute the possible solutions to the relation w.r.t to the
    node types and assigned value solution = evaluate_relation(T,
    l(s), l(t), s.val)
if not solution:
    return Failed
t.intersect(solution)
if t.size == 1:
    t.val = t[0]   # asssign the only remaining value in the
                     domain
    return Finished       # constraint is finished
return # value from t.domain has to be selected by the solver
```

In this example, the propagator filters values directly based on the relations between nodes in T. It evaluates the relation ("evaluate_relation") and removes values from the partner node's domain where no connection exists ("t.intersect"). If the relation between the pair is functional, it can directly assign a solution ("if t.size==1"). Even if this is not the case, the shown propagation is powerful enough to subsume the domain, meaning that only valid solutions for this constraint remain in the domains and no further propagation is necessary. The remaining domain values are evaluated with respect to the other constraints over their variable. If a propagation leads to an empty domain, the assignment failed.

When values are assigned to both nodes s and t of the instruction data flow graph IDG, the constraint may check for correctness by verifying there is an edge in the computation data flow graph CDG connecting the pair, e.g., Asn $((s,t),(d\_s,d\_t)) \in E_o$. In particular, this may involve enforcing that a self-edge of the instruction data flow graph IDG representing a commutative reduction operation is mapped to a self-edge of the computation data flow graph CDG.

It is not needed that the data flow constraints enforce a strict isomorphism. Various relaxations may be employed. For example, instead requiring that a source operation of the instruction data flow graph IDG is mapped to an identical target operation of the computation data flow graph CDG, it may be sufficient to require that the source operation is a generalization of the target operation, e.g., an operation with at least an accuracy required by the target operation, or an operation that can be instantiated by the source operation. As also discussed elsewhere, relaxations may be employed to enable mapping a commutative reduction operation of an instruction data flow graph to a node of the computation data flow graph that represents a single reduction of the commutative reduction operation. Another example of not enforcing a strict isomorphism is the use of dummy operations, as also discussed elsewhere.

As the inventors realized, in order to define what constitutes a possible invocation of the hardware-accelerated instruction in the computation, it is in many cases not sufficient to define equivalence of data flow by means of data flow constraints. Namely, as shown in the figure, the hardware-accelerated instruction and/or its programming interface may impose a set of hardware restrictions HWR, 320, on possible invocations. Defining Def the constraint satisfaction problem CSP may comprise defining one or more constraints CONS representing these hardware restrictions. The hardware restrictions HWR may be represented in various ways, e.g., as constraints, as templates from which constraints are instantiated when defining the constraint satisfaction problem, as code that implicitly defines constraints based on the instruction and/or computation data flow graphs, etc.

In particular, the hardware restrictions may impose one or more input constraints restricting which nodes of the computation data flow graph CDG can be assigned to the inputs of the hardware-accelerated instructions, e.g., can be assigned to input nodes of the instruction data flow graph IDG. Such constraints may enforce that the inputs have an allowed memory layout and/or an allowed access pattern, for example. Similar constraints can also be placed on the outputs of the hardware-accelerated instruction, e.g., if the outputs are to be used in another computation or other part of the current computation that requires a certain memory layout. Apart from restrictions imposed by the instruction, it is also possible to include restrictions to obtain an invocation with other desired characteristics, e.g., an invocation that uses the first element of the input array, etc. This may make it easier to generalize the found invocation to generate code for the full computation. Generally, a suitable set of constraints CONS may depend at least on the hardware target and the available code generation methods.

For example, the constraints CONS may include one or more of the following:
- restricting inputs to allowed memory access patterns; for example, the input access pattern may be restricted to a stencil computation, or an access patterns with a regular stride and/or offset; propagation may bound values in such dimensions to zero, which can remove a large part of the search space in computations where these access patterns exist;
- restricting mapping instruction inputs to specific axes in the computation;
- restricting the instruction to be applied to certain values in the computation; for example, by restricting the first output in the instruction the first output element in the computation the search may be fixated the search to values around these points.

Interestingly, including additional more constraints may make the solution space more specific, while relaxing constraints can serve as a tool for implementation strategy exploration. Constraint solving is beneficial because it provides expressiveness in the program formulation and has customizable propagation and search algorithms.

The constraint satisfaction problem CSP may be defined in such a way that operations of the hardware-accelerated instruction can be mapped to dummy operations that do not affect the computation. Effectively, an "imperfect" (e.g., non-isomorphic) embedding of the instruction into the computation may be obtained. This can allow to find invocations where this is otherwise not possible. For example, it may not be possible to evenly divide a computation into smaller sub-problems, computed by the instruction. Allowing dummy operations, enables to use the hardware-accelerated instruction also in such situations. For example, an 8×8 matrix multiplication may be performed with a hardware-accelerated instruction for 16×16 matrix multiplication. This instruction can be used by padding the input and output tensors: the shape can then match the instruction and the instruction can be used. Dummy operations can be allowed in the constraint satisfaction problem by any combination of allowing or constraining overlapping/duplicated computations; allowing or constraining overlapping/duplicated memory accesses; and allowing or constraining the insertion of dummy values into the computation. Typically, as dummy value, a neural element of an operation is included so that the result of the computation is not affected, e.g., zero (e.g., for addition) or one (e.g., for multiplication). These values may be added to the domains DOM of the respective variables.

It is also possible to include constraints into the set of constraints CONS to make the constraint satisfaction problem CSP easier and thereby more efficient to solve. For example, the domain size of a group of variables may be reduced by applying a pruning constraint to a group of variables of the instruction data flow graph IDG that have the same domain, for example, all variables describing the output operation of the instruction. For example, the extent of a domain $d_m$ may be described by a vector $(e_0, \ldots, e_m)$, e.g., $d_m$ (4,4,4) may denote a cube of edge-length 4. A coordinate in the cube may thus be described as (i,j,k) with $0 \le i < 4, 0 \le j < 4, 0 \le k < 4$. Thus, by setting the upper bounds $e_*$, e.g., setting $e_i=2$, the extent of a domain may be controlled. For example, the following unary pruning constraint may be used to threshold the size of all dimensions in an m-dimensional domain $d_m = (e_0, \ldots, e_m) \subset S$ for all variables in g by:

$$\forall\, e_i \in (e_0, \ldots, e_m) \mid 0 \le i \le m : e_i = \begin{cases} e_i & \text{if } \#g * \text{stride} \le e_i \\ \#g * \text{stride} & \text{otherwise} \end{cases},$$

where #g is the number of variables assigned to this group and $e_i$ is the size of one dimension. It is also possible to limit a coordinate of a domain for a group of variables to any other threshold value, e.g., to the length of a dimension of the instruction, etc. A pruning constraint is a low overhead constraint that reduces the search space.

Accordingly, the constraint satisfaction problem CSP may assign nodes of the computation data flow graph to nodes of the instruction data flow graph. In some embodiments, a node of the computation DFG is assigned to each node of the instruction DFG. In some embodiments, to each node of the instruction data flow graph, either a node of the computation data flow graph or a node representing a dummy input or operation is assigned. In some embodiments, to each node of the instruction DFG, a different value is assigned, e.g., each node of the computation DFG may be assigned at most once.

Also shown in the figure is an operation Solve, 365, that takes the constraint satisfaction problem CSP and solves it to determine a possible invocation INV, 370, of the hardware-accelerated instruction in the computation, if it exists. The invocation INV may map nodes of the instruction data flow graph IDG to nodes of the computation data flow graph CDG, as illustrated in the figure by dashed arrows going from nodes b, c, d of the instruction data flow graph IDG to nodes B, C, D, of the computation data flow graph CDG. Several desirable properties of the invocation INV are illustrated by in this example. As illustrated, each node of the instruction data flow graph IDG may be mapped to a node of the computation data flow graph CDG; however, the computation data flow graph typically has additional nodes: nodes A and E in this example. Presence of an edge between respective nodes of the instruction data flow graph IDG may imply presence of an edge between the respective nodes of the computation data flow graph CDG that they are mapped to; but there may be additional edges, e.g. the edge between nodes A and C and the edge between node D and node E in this example. However, a non-input node of the instruction data flow graph, e.g., node d, is typically mapped to a node of the computation data flow graph, e.g., node D, with the same number and/or type of incoming edges.

To execute the solving operation Solve, various constraint programming techniques are conventional in the related art and can be applied herein. Interestingly, the algorithm used by the constraint solver to find solutions to the problem can in many cases be customized. This allows control over the solution space, e.g., prioritization of certain solutions, without changing what it means for a solution to be valid or not. In particular, many existing constraint solvers Solve allow customization of a propagation algorithm, a variable selection strategy, and/or a value selection strategy.

The propagator may be used to remove values from the domains DOMS that cannot be part of a valid solution. The propagator may be a monotonic filtering algorithm, in the sense that it removes but does not add values from a domain. The propagator is typically specific for each constraint CONS. The propagator may infer which values to remove from a domain based on the domains DOMS and assignments of other variables under the same constraint. To find a solution, the solver Solve may use a search algorithm to systematically perform assignments and propagate the assignments through the domains DOMS. An example propagation algorithm for enforcing data flow constraints is given elsewhere in this specification.

The solver Solve in many cases uses a backtracking-based search algorithm to find all possible solutions in a given problem. This may involve a variable selection strategy that determines which variable $x \in X$ from the set of variables VARS is assigned a value next. A value selection strategy may determine in which order to search the domain of a variable, e.g., it may be regarded as a specific implementation of Asn(d,x). Variable and value selection impact the time-to-solution, and also affect the order in which solutions are output. Thus, by optimizing the value and variable selection strategies, both the efficiency of the solving and the quality of the determined solutions can be affected.

For the variable selection strategy, it is preferred to use a strategy that propagates backwards through the instruction data flow graph. The outputs may be selected first, and then solving may proceed go backwards trough the graph. It was found that this strategy has the most propagation potential for relevant computations, e.g., of neural network layer evaluations.

For the value strategy, one example is to use a lexicographic search. In many cases, the value selection strategy may be optimized based on additional information about the structure of the input data of the hardware-accelerated instruction. For example, in many cases, the hardware-accelerated instruction may have a multi-dimensional input, and the values to which the instructions may be applied, may have multiple dimensions as well. In such cases, as a value selection strategy, a portfolio search strategy may be used. In such a search, multiple so-called assets, that each provide an order in which values are assigned to a variable, are searched in parallel. The different assets may correspond to different mappings between dimensions of the hardware-accelerated instruction and dimensions of the possible input values. An asset may prioritize assignments according to its respective dimension mapping. These different assets may be searched in parallel, resulting in a stabilization of the search duration over a wide range of computations.

Interestingly, when using a portfolio search strategy, the number of possible assets may be limited by limiting which dimensions of the instruction may be mapped to which dimensions of the computation. This depends on the instruction and computation at hand and may be performed by manual annotation, for example. For example, the dimensions of the instruction and operation may be partitioned into reduction dimensions and non-reduction dimensions, e.g. for matrix multiplications. In the portfolio search strategy, reduction dimensions of the operation may then be mapped only to reduction dimensions of the computation, and similarly for non-reduction dimensions. This way, the number of assets can be significantly limited, improving performance. For example, a matrix multiplication over (I,J,K) has two space dimensions (I,J) and one reduction dimension (K). The value selection strategy may try to directly embed between dimensions in the computations and the dimensions of the matrix multiply. In an asset, the search may prioritize the three selected dimensions. If $n_s$ is the number of space dimensions and $n_k$ the number of reductions in the computation, the number of assets may be $$\frac{n_s!}{(n_s-2)!} \cdot \frac{n_k!}{(n_k-1)!}).$$

This is a significant reduction compared to the $(n_s+n_k+1)!$ possible permutations of the domain that may otherwise be possible. Within an asset, lexicographic search can be applied as a value selection strategy, for example.

If the solver Solve fails to find a solution in these initial portfolios, the constraints on the search space may be relaxed and the search may be repeated with a wider solution space.

Generally (and instead of or in addition to repeating the search when using portfolio search as discussed above), if the solver Solve fails to find a solution to the constraint satisfaction problem CSP, the constraint satisfaction problem CSP may be relaxed and the solving Solve may be repeated, e.g., until a solution has been found or no more suitable relaxations are available. For example, the constraint satisfaction problem may be relaxed to allow dummy operations, constraints enforcing particular inputs to be used may be relaxed; etc. Such relaxations may result in less optimal solutions, e.g., less operations of the operations are optimized, or more pre-processing is needed to get the data in the right shape to be processable by the hardware-accelerated instruction, but by performing these relaxations it can be enabled that the hardware-accelerated instruction can be applied also in such less-than-ideal situations.

Also shown in the figure is an optional compilation operation Comp, 345, that may use the determined invocation INV to generate machine-executable instructions INSTR, 350, implementing the computation. Instructions INSTR may invoke the hardware-accelerated instruction according to the determined possible invocation INV. For example, the invocation INV may be used to generate compileable code that is then compiled to obtain the instructions INSTR. The rules used to generate the code from the invocation compilation INV for a particular hardware-accelerated instruction typically depend on the code generation interface that is offered. Generally, by including sufficient input constraint to the constraint satisfaction problem CSP according to how the programming interface allows the hardware-accelerated instruction to be called, translating invocation INV to instructions INSTR can be done relatively straightforwardly.

In some embodiments, the instruction data flow graph may include nodes for only a subset of outputs of the hardware-accelerated instruction. In order to generate machine-executable instructions INSTR, the invocation INV may be used to infer a mapping of some or all remaining outputs of the hardware-accelerated instruction to operations of the computation. Accordingly, the hardware-accelerated instruction may be applied to a larger part of the computation than indicated by the mapping of possible invocation INV. For example, in a matrix multiplication, a computation of an output element shares a set of input nodes with its neighbours but no intermediate results. Thus, the invocation INV may provide a mapping for only one output element, and this mapping may then be generalized by using it to implement a full matrix multiplication of the computation.

Interestingly, generating instructions INSTR may also involve generalizing the determined invocation INV to obtain further invocations of the hardware-accelerated instruction. For many practical computations, including neural network workloads such as convolutions, it is possible to extrapolate an implementation of the computation with multiple invocations from a single determined invocation INV. To this end, one or more features may be extracted from the determined possible invocation INV, based on which the determined invocation INV may be generalized. For example, the computation Comp may be implemented entirely by invocations of the hardware-accelerated instruction in this way.

For example, for a convolution, the variables of the computation data flow graph CDG associated with the input and output values of the instruction data flow graph IDG may be evaluated to compute which dimension of the instruction is matched to which dimension in the workload, and what the tiling factors are. From this, instructions INSTR implementing the full convolution may be implemented. For example, the matched dimensions may be tiled by the found factors and moved to be the innermost dimensions. These tiling and reorderings may be fixed for the embedding. Other loops and tensor dimensions may still be transformable for further performance optimizations, e.g., loop tiling, reordering, fusion, etc., may be applied. Such further performance optimizations may be automatically determined using AutoTVM or similar tools. Instructions INSTR with embedded invocations of the hardware-accelerated instruction can be generated by TVM's VTA programming tool flow, for instance.

Also shown is an optional evaluation operation Eval, 355. In many cases, constraint solver Solve is able to determine multiple invocations INV that solve the constraint satisfaction problem CSP, e.g., to enumerate all possible solutions to the constraint satisfaction problem CSP. In the evaluation operation Eval, the performance of multiple such invocations may be evaluated, and a solution may be selected from the multiple solutions based on this performance evaluation. The evaluation can be performed based on the determined machine-executable instructions INSTR, e.g., by executing or simulating the instructions and measuring performance; or by computing a (typically hardware-specific) cost function directly on the invocation INV without first determining the instructions INSTR.

Generally, the techniques described herein may be applied to various types of computations and hardware-accelerated instructions. The hardware-accelerated instruction may implement one or more of a matrix multiplication, a convolution, a dot product, a matrix-vector product, a cumulative sum, a pooling, and a Hadamard product. The computation may comprise an evaluation of a convolutional operator, a multiplication, or a pooling operation of a neural network layer, for example.

Typically, at least the hardware restrictions HWR depend on the target hardware, whereas the computation data flow graph CDG depends on the computation to be performed. Thus, for example it is possible to determine implementations for multiple computations by applying the presented approach to multiple different computation data flow graphs CDG using the same instruction data flow graph IDG and hardware restrictions HWR; and to determine multiple implementations of the same computation by applying the presented approach using the same computation data flow graph CDG and multiple different hardware restrictions HWR and/or instruction data flow graphs IDG.

FIG. 4B shows a detailed, yet non-limiting example of a polyhedral representation that defines a data flow graph. In various embodiments, a computation data flow graph or part of it may be represented by a polyhedral representation.

As discussed with respect e.g. to FIG. 3, a possible invocation of a hardware-accelerated instruction in a computation may be determined by solving a constraint satisfaction problem in which nodes of a computation data flow graph are assigned to nodes of an instruction data flow graph. In many practical cases, the number of nodes of the computation data flow graph can be quite large, e.g., at least 1024, at least 4096, or at least 104876 nodes. Interestingly, however, the inventors realized that by using a polyhedral representation to store the computation data flow graph, or at least parts of it, it can be avoided to explicitly determine and store a list of all nodes and/or edges of the computation data flow graph. This improves the performance of the constraint solver.

Generally, in a polyhedral representation, a set of nodes of a data flow graph is symbolically represented, e.g., a representation is used that describes which nodes are in the set without explicitly enumerating them. Also sets of edges, e.g., incoming and/or outgoing edges of the set of nodes, may be represented symbolically. When solving the constraint satisfaction problem, a particular node from the set of nodes may be obtained by instantiating the polyhedral representation, e.g., by selecting the node according to a value selection strategy as described herein. A node of the instruction data flow graph may then be mapped to this instantiated node.

As an example, the figure graphically represents a data flow graph using polyhedral representations. As in FIG. 4A, a 4×4 matrix multiplication is represented, e.g., a tensor expression $T:A_{i,j}=\Sigma_k X_{i,k} \cdot Y_{k,j}$. This computation may be represented as the loop nest: for i in I: for j in J: for k in K: A[i][j]+=X[i][k]*Y[k] [j].

Input tensors may be described by a set of their shape. For example, shown in the figure is a polyhedral representation x, 410, of a set of input nodes of the data flow graph. This set corresponds to a set including nodes 411-414 of FIG. 4A, for example, and may be described by the set $$X=\{(i,k)|0\le i<I, 0\le k<K\}.$$

Also shown is polyhedral representation y, 420, of another set of input nodes of the data flow graph, including nodes 421-424 of FIG. 4A. This set may be described as:

$$Y=\{(k,j)|0\le k<K, 0\le j<J\}$$

The scalar multiplication operations of the matrix multiplication computation may be represented by a polyhedral representation *, 430, e.g., including multiplications 431-434 of FIG. 4A. The scaler addition operations of the matrix multiplication computation may be represented by a polyhedral representation +, 440, e.g., including addition 441 of FIG. 4A.

The scalar multiplications and additions together may be represented by a set:

$$S=\{(i,j,k,n)|0\le i<I, 0\le j<J, 0\le k<K, 0\le n<\#T\},$$

I,J,K are the domain bounds. S also contains an additional dimension that describes which element of the original tensor expression T is selected, e.g., in this case, whether the node represents an addition or a multiplication.

The set of nodes of the data flow graph may be formed as a union of sets defined by polyhedral representations, e.g., $N_o \equiv S \cup X \cup Y$.

Also sets of edges between the nodes of the data flow graph may be defined by polyhedral representations. A polyhedral representation may correspond to a binary relation between two domains. There is an edge, e.g., a data flow, between two instances $(s1,s2) \in S$ if there exists a relation for which $s1 \rightarrow s2 \ne \emptyset$.

For example, in FIG. 4B, the edges between respective sets of nodes 410, 420, 430, 440 may be defined by the following relations:

$$R1: * \rightarrow + = \{i,j,k,n \rightarrow i',j',k',n'|i'=i,j'=j,k'=k,n=n_*, n'=n_+\};$$

$$R2: + \rightarrow +' = \{i,j,k,n \rightarrow i',j',k',n'|i'=i,j'=j,k'=k+1,n'=n=n_+\};$$

$$A_X: X \rightarrow * = \{i,k \rightarrow i',j',k',n'|i'=i,k'=k,n'=n_*\};$$

$$A_Y: Y \rightarrow * = \{j,k \rightarrow k',j',i',n'|j'=j,k'=k,n'=n_*\}.$$

In the above example, relation R1 specifies that multiplication and addition happen in the same loop iteration, but are ordered by their position in tensor expression T. R2 can be interpreted as two add operations happening sequentially in iteration dimension k. $A_X$ and $A_Y$ encode the access function itself and by which node the access is performed, in this case the multiplication in T. The union of all relations may describe the edges of the data flow graph $G_o$, and specifically for the example, $E_o = R1 \cup R2 \cup A_X \cup A_Y$.

In this example, a set of nodes 440 and a corresponding relation R2 are used to represent a commutative reduction operation, in this example, addition. As discussed with respect to FIG. 4A, in an instruction data flow graph, such a commutative reduction operation may be represented by a single node, e.g., node 441 of FIG. 4A. In such cases, node 441 of the instruction data flow graph may effectively correspond to the set of nodes 440 of the computation data flow graph. Effectively, relation R1 may correspond to incoming non-self-edges of node 441 whereas relation R2 may correspond to the self-edge. In this case, the constraint satisfaction problem may be configured to allow node 441 to be mapped to any of the nodes in the set of nodes 440. To accommodate mapping a commutative reduction operations to a node of the set of nodes 440, the term controlling the reduction order can be relaxed, e.g., the term for k' in R1 and R2 may be relaxed such that it does not determine any ordering of the reduction. By this relaxation, each node of set 440 may effectively be regarded as a commutative reduction node. Interestingly, although this relaxation greatly increases the number of edges in the graph, it can be implemented efficiently using the polyhedral representation because it is not needed to fully instantiate the computation data flow graph. Alternatively, a commutative reduction operation can be represented as a single node also when using the polyhedral representation.

Labels of nodes and/or edges of the data flow graph can be provided as a common label for the set, or a symbolically defined separate labels, for example. The labels may indicate types of inputs or outputs; a type of operation, etc. For example, nodes 410 may be labelled as "OutType: int8"; nodes 420 as "OutType: int8"; nodes 430 as "InType: int8; OutType: f32; Op: mul"; and nodes 440 as "InType: f32; OutType: f32; Op: add".

Also pairs of mutually parallelizable operations can be indicated in polyhedral notation. For example, as also discussed with respect to FIG. 4A, pairs of mutually parallelizable operations may be indicated by spatial edges. A set of such edges can also be represented in polyhedral representation.

With respect to the relations describing the set of edges, several cases may arise. Some or all of the relations may not be symmetric. One or more relations, such as relation $* \rightarrow X$ in this example, may be surjective and functional, e.g., a multiplication may map to exactly one tensor element in X it consumes. One or more inverse relations, such as relation $X \rightarrow *$, may be non-functional, e.g., an input element in X may be used by multiple multiplications, but not all of them. This may be observed by the relation of $A_X$ and $A_Y$, as they contain no term with properties for i' or j' respectively. For one specific input value in X the relation may describe the subset of all multiplications using this value.

Generally, the set S of operations of the data flow graph that are defined by polyhedral representations may be referred to as the instance set, with elements being referred to as dynamic execution instances. The set S may be described by a set of integer tuples, wherein an integer tuple describes a dynamic execution instance, e.g., a node. To describe the sets of integer tuples, for example, the following notation may be used:

$$\{(e_0, \ldots, e_n)|\tau_0, \ldots, \tau_n\}$$

For example, a respective term $\tau_j$ may provide fixed lower and/or upper bounds of a respective tuple member $e_j$. The conjunction of all $\tau$ terms may thus define a full set. A domain of the constraint satisfaction problem may be defined as a subset of a set of integer tuples, e.g., a defined by the node type. For input nodes, the domain may be described by a set of tuples in the shape of the respective tensors. For operation nodes, the domain may be the set of tuples representing operations, or a subset thereof.

The union of binary relations between pairs of instances, e.g., sequential edges of the graph, is also sometimes referred to as a data dependence relation D. A relation between elements from a source set to a target set may be denoted as:

$$S_{source} \rightarrow S_{target} = \{(e_0, \ldots, e_n) \rightarrow (e'_0, \ldots, e'_n) | \Phi_0, \ldots, \Phi_m\}$$

where a term $\Phi_k$ describes a condition in the relation. An elements in the target tuple may be denoted e'. Relation condition $\Phi_k$ may be used to describe a source element e that maps to element e' in the target set. The conjunction of all $\Phi$ terms may describe the whole relation domain.

The use of polyhedral representations is particularly beneficial for computations that are part of a neural network layer evaluation, such as a convolution, a matrix multiplication, or a pooling operation. Such computations typically operate over tensors, e.g., n-dimensional arrays, with bounds that are known at compile time. Typically, different output elements are computed the same way, but with a different slice of input values. The computations typically also involve deep loop nests without conditional statements and are highly structured. This makes it particularly efficient to represent them using polyhedral representations.

Interestingly, the use of polyhedral representations in a constraint satisfaction problem as described herein, does not incur a loss of generality. Mapping the instruction to the computation is still done at the level of individual nodes, e.g., at the scalar level. A constraint solver can assign any computation data flow graph node from a set of described nodes to an instruction data flow graph node, regardless of how the set is described, e.g., regardless of the order of dimensions.

This is unlike other approaches in which explicit transformations are applied to polyhedral representations, in which case the way the set is described encompasses modelling assumptions that are hard to overcome.

FIGS. 5A-5D show a detailed, yet non-limiting example of applying hyper-rectangle constraints. In various settings, it is beneficial to restrict the inputs of the hardware-accelerated instruction to form a regular shape. This can lead to implementations with more efficient memory access, and/or for which efficient memory layout transformations are available for allowing the hardware-accelerated instruction to be invoked on the inputs. In particular, this example shows how a set of hyper-rectangle constraints can be used to enforce that the inputs form a hyper-rectangle.

The term hyper-rectangle is used herein to generally refer to a rectangle with any number of dimensions n>0, e.g., n=1, n=2, n=3, or n>4. The points may be arranged on the hyper-rectangle as a square lattice, e.g., forming a set of points $(x_1 + \ldots + x_n) + \delta_1 \cdot (s_1, 0, \ldots, 0) + \delta_2 \cdot (0, s_2, 0, \ldots, 0) + \ldots$ for $0 \leq \delta_i \leq \Delta_i$, where the $s_i$s are strides that each separately can be fixed, e.g., set to one, or be determined dynamically.

Use of a hyper-rectangle is suitable, for example, for computations arising in neural network evaluations, since such computations typically involve (often large) tensors, e.g., n-dimensional arrays. A hyper-rectangle shape is particularly beneficial for efficient memory access and to enable the hardware-accelerated instruction to be efficiently invoked by using a memory layout transformations, e.g., a transpose or a tiling of tensor dimensions. Constraints can be used to make sure that the variables assigned to the input values of the solution form a hyper-rectangle, e.g., a hyper-rectangle aligned with a vector base of the tensor space. Another advantage is that constraining inputs to forming hyper-rectangles may allow the constraint solver to eliminate potential assignments to input nodes of the instruction data flow graph relatively easily, which can greatly improve the efficiency of the constraint solving.

The hyper-rectangle constraints may be configured to match and propagate the shape of a hyper-rectangle with a number of dimensions n>0 from an ordered tuple of points $V = (v_0, \ldots, v_n)$, e.g., corresponding to the inputs of the hardware-accelerated instruction. The constraint may be configured to infer a bounding box from the set of input points to which values of the computation are assigned so far, and from the total number of points in V. Values that are outside of the bounding box may be eliminated as possible values for the remaining input points of the hardware-accelerated instruction. Accordingly, already after a few assignments, it is typically possible to eliminate a large part of a domain. For example, after selecting only two points along one axis of the tensor, this dimension may be bounded to a size of bound=#V·|v_0−v_1|.

The rectangle may be computed by performing a linear iteration of the set of points V, comprising iteratively attempting to infer whether the points create a rectangle with any number of arbitrary dimensions. In particular, if the points describe a lattice in lexicographic order, an iteration may involve performing one of the following steps. A base step may represent a movement from one element in the innermost dimension, to the next element. A dimension jump may represent moving to a next line of the innermost dimension, e.g., moving diagonally through the space. To enforce a lattice structure, the base steps may be required to be identical and repeated for fixed number of times before a dimension jump happens. A dimension jump may add a new dimension to the rectangle. For a dimensions $[n_0, \ldots, n_m] \in \text{Rec}$, a dimension jump $n_k$ where $0 \leq k \leq m$ may be required to happen $\Pi_{i=0}^{k} d_i$ times. A dimension jump may have a shape defined by a vector $jmp = v_a - v_{a+1}$, which may be required to be the same as $v_o = (v_0 - v_a) + v_b$ where $v_0$ is the first point in V and $v_b$ is one of the tensor's base vectors scaled by an integer factor. By restricting $v_b$ to be an element of the vector base, it may be assured that there are right angles at the corners, and that the rectangle is axis aligned.

FIGS. 5A-5D shown an example of enforcing hyper-rectangle constraints that enforce a lattice structure on the set of points. The figure shows an example of how the constraint may be enforced and propagated. In the figures, filled dots 512, 522, 532 represent domain values; crosses 511, 521, 531, 541 represent a selection for one of 16 variables; empty dots 533, 543 represent values removed by propagation.

In this example, in the first 4 steps, no propagation may be possible yet (FIGS. 5A-5B), since the size of the dimension along the x axis, 8, is smaller than the total number of variables, 16. However, once the fifth value is selected, values may be removed from the domain. In this example, values (y,x) with x>3 can be removed, since this is the size of the innermost dimension and this has to be same for every outer dimension. From the value (1,0) selected for the fifth variable, the propagator can infer that the expansion into the y dimension can be no larger than:

$$d_y = \frac{\#V}{\prod_{i=y+1}^{n} d_i \cdot stride_i}$$

In this example, this is $$d_y = \frac{16}{4} \cdot 1 = 4.$$

Figure 5A:
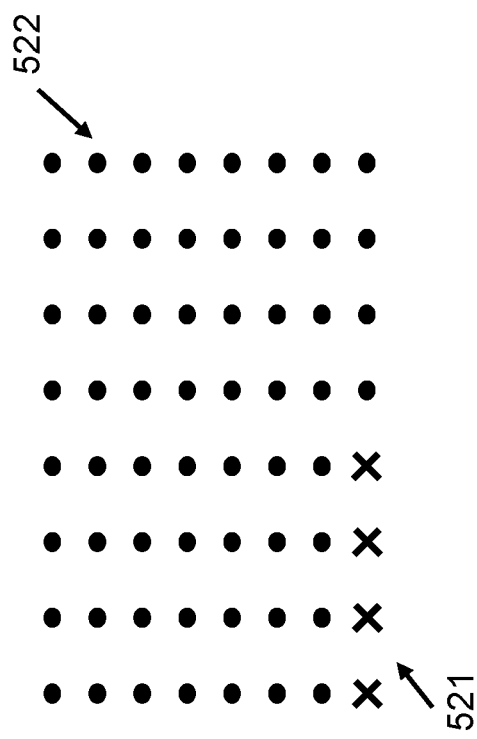
FIGS. 5A-5D show a detailed example of applying a hyper-rectangle constraint, in accordance with an example embodiment of the present invention.
Figure 5B:
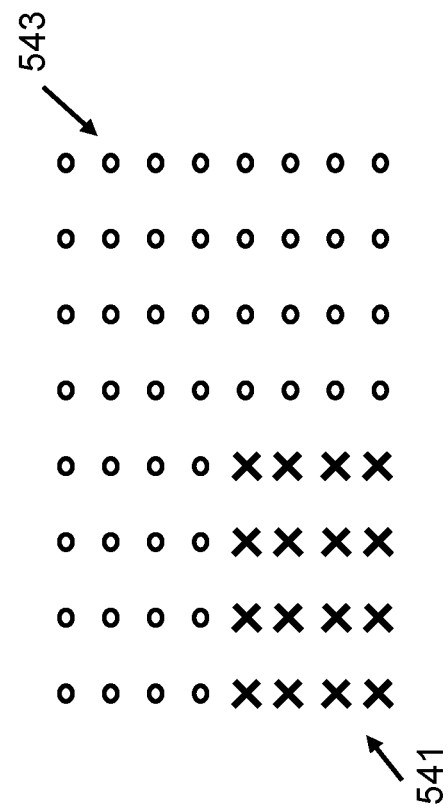
Figure 5C:
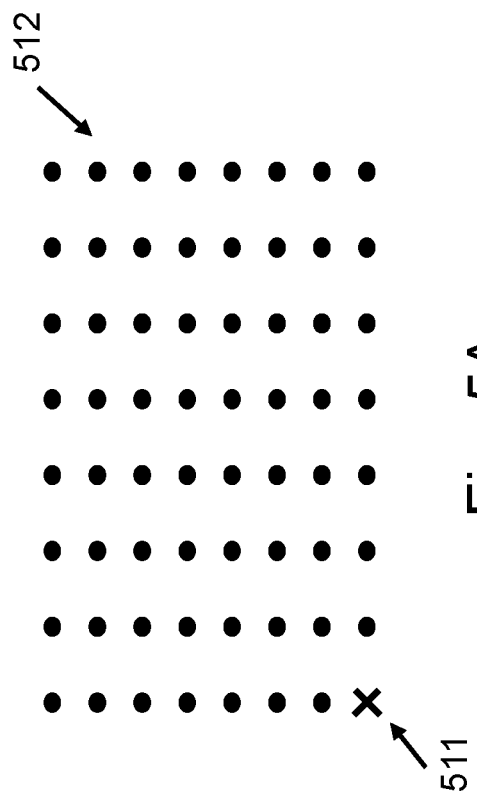
Figure 5D:
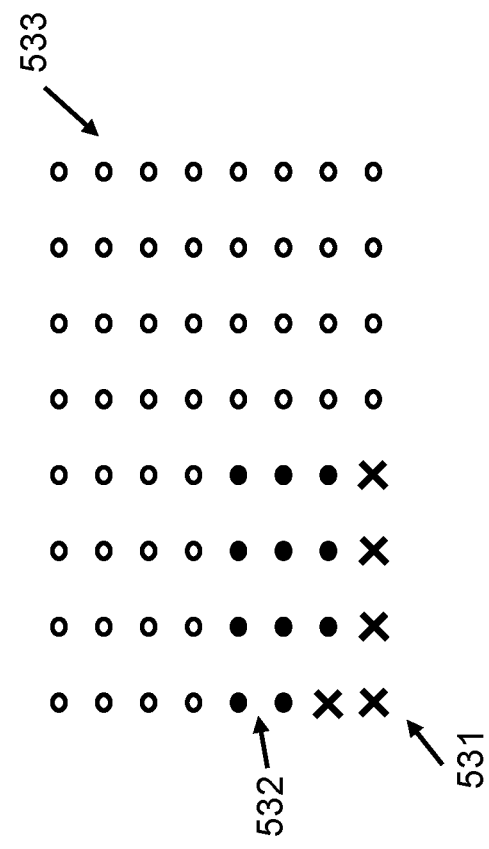

Thus, points 533 can be eliminated (FIG. 5C). The remaining points are mapped as shown in FIG. 5D.

Interestingly, by implementing the hyper-rectangle constraint by iterating over the set of points V, the obtained constrained may be transparent to the relative dimension ordering between instruction and workload. As a result, any dimension in the workload may be mapped to any dimension in the instruction without e.g. having to perform a transpose operation. Interestingly, the mapping may be used to derive which memory transformations, e.g., transposes, tiling, fusion, etc. to use in generating code that invokes the hardware-accelerated instruction.

A detailed example of an implementation of a hyper-rectangle constraint is provided next. The algorithm also works on partially assigned rectangles. The information found during the inference can be used directly to propagate the domains of the remaining values by computing a bounding box, which is the largest possible rectangle that can be formed by the outstanding assignments.

The algorithm starts by looking at the first step, and if it is not axis aligned, it returns a failure. Then it removes the performed step from the vector base, so that each tensor dimension is used once. Then the rest of the points is iterated, and every step is tabulated. The live_tbl records the steps being taken. Once a dimension jump to $d_k$ happens, the number of steps performed for $d_{k-1}$ are recorded in the dim table. Every step happening is checked if it already recorded or not. If it already happened, counters_valid checks if the step happened at the correct time and resets all counters the inner dimensions. In the example of FIGS. 5A-5D, there need to be four steps in the x dimension for every step in the y dimension. Once the y step happened, the counter for x is reset.

---
Algorithm. Hyper-rectangle constraint
---

V = <tuple of points>
VB = <vector base of tensor>
u_hat, scale = unit_vector(V[1] − V[0])
if (u_hat) not in VB: // if the first step is not axis aligned:
break
    return false
VB = VB − u_hat // remove u_hat from the base to never use this dim again
V = V − (V[0], V[1])    // remove these values form list
dim_table = { }    // keep track of finished dimensions
live_tbl[u_hat] =1  //  keep the count in the current traversal
inner_dims[u_hat] = { }  // keep track of the inner dims of a dimension
for (v_n in V[1::1]):    // now scan the rest
    s = v_n − v_n−1
    if step in inner_dims:    // a step we took before
        update_counters(live_tbl)
        // check if we moved in this dicrection at the right moment
        if not counters_valid(live_tbl, dim_table, inner_dims):
            return false
    else:
        // check if we can make a "dimension_jump"
        if not counters_valid(live_tbl, dim_table, inner_dims):
            return false
        if is_dimension_jump(s):    // is a valid move in the rectangle
            update_tables(dim_table, live_table, inner_dims, s)
        else
            return false
return dim_table    // information to compute the bounding box

---

Details are now provided of experiments in which the discussed techniques are applied to generate code for the VTA hardware accelerator, which provides a hardware-accelerated matrix-multiply (GEMM) instruction. The hardware is instantiated on a ZynqUltrascale+ FPGA with a 256 kb weight buffer, a 128 kb data buffer and a GEMM core consuming int8 inputs and producing float32 results. The GEMM unit computes $C_{xy} += A_{xz} \cdot B_{zy}^T$ with (x,y,z)=(1,16, 16). Its results may for example be processed by a vector-scalar unit for activation and quantization operations. Notice that matrix operand B is transposed. The hardware has a load/store unit for independent memory accesses of matrix operands. It can load and store full 2D operand matrices stored consecutively in memory. The experiments use computations from the Baidu DeepBench Inference Benchmark.

Code generated according to the presented technique is compared against the conv2d reference implementation of TVM, which maps the three axes x,y,z of the GEMM unit statically to the batch n=x, output channel oc=y, and input channel ic=z dimensions in the convolution. The TVM convolution implementation expects a NCHW (N=batch size, C=channel, H=height, W=width) memory layout.

In the experiments, machine-executable generations were generated using the TVM machine learning compiler framework. When TMV encounters an operator that can be accelerated by the hardware, the implementation is handled by a specified deployment strategy. A strategy implements the operator in TVM's IR, optimized for the hardware target. TVM's code generation tool flow for VTA can be used by integrating our approach into VTA's strategy. The instruction DFG $G_i$ is generated based on the hardware configuration. Based on this, a constraint satisfaction problem is defined as described. The nodes of $G_i$ are the variables, the operator's dynamic instance set forms the domain.

In one experiments, the constraint solver was used to determine possible invocations similar to the reference implementation. To this end, the following constraints were used:
    data flow constraints for matching the dataflow of the GEMM instruction;
    hyper-rectangle constraints to ensure that input and output elements are mapped into an axis aligned shape, allowing simpler memory transformations based on transpose and reshape operations;
    an allDiff constraint to prevent the same dynamic execution instance from appearing multiple times in the same instruction call.
    a fixed origin constraint enforcing the first match of all input and output tensors to be fixed to the origin of the respective domain;
    a denseness constraint disallowing strides in any dimension for the input and output tensors;
    a memory access constraint to only allow matches in workload dimensions with access patterns matching the instruction, e.g., no strides or stencil patterns.

Given a computation, the constraint solver can be used to obtain possible invocation describing how each operation and data element of the instruction $G_i$ maps to a node of the computation $G_o$. Due to the regularity of DNN workloads like convolutions, it is feasible to extrapolate the found invocation to an implementation that repeatedly calls the hardware-accelerated instruction. In the solution, the variables associated with the input and output values are evaluated to compute which dimension of the instruction is matched to which dimension in the workload, and what the tiling factors are. This information allows the code to be generated. The matched dimensions are tiled by the found factors and moved to be the innermost dimensions. These tiling and reorderings are fixed for the embedding. Other loops and tensor dimensions are free to be transformed for further performance optimization. These optimizations include loop tiling, reordering or fusion. AutoTVM was used to automatically determine the best optimization parameters for every conv2d layer. Code with embedded instructions was generated by TVM's VTA programming tool flow.

The experiments demonstrated that it was possible to automatically generate implementations with similar structure and performance to an expert-made reference implementation. Interestingly, for some of the benchmark computations, code generated based on the determined possible invocations achieved a significant speedup compared to the reference implementation. Namely, for some benchmark computations, the reference implementation achieves very low hardware utilization due to its static embedding strategy. For these computations, a speedup by a factor up to ×2.49 was achieved, and for individual operators, improvements as high as ×238 were observed. Thus, in these scenarios code generated automatically according to the determined invocations provided a significant performance improvement.

In another experiment, the provided techniques were used to dynamically change the computations tensor layout of a DNN. The solution to the constraint satisfaction problem indicates which dimensions are necessary, and thus which ones are free, allowing the memory layout of the free dimensions to be changed during code generation. In this experiment, the constraint solver was used to generate possible invocations according to the NHWC (N=batch size, H=height, W=width, C=channel) layout. In many cases, this was found to improve performance compared to the NCHW layout used by the reference implementation.

In a further experiment, memory access constraints were relaxed compared to the previous experiments. This increases the number of solutions to the constraint satisfaction problem. As discussed, in the above experiments, constraints were included to obtain solutions similar to the reference implementation. For some of the benchmark computations, these constraints resulted in a necessity to perform zero padding in the ic dimension, because ic/z<1, resulting in lower utilization and larger tensors. Interestingly, by relaxing these constraints, it was found to be possible to determine possible invocations that required less or no padding, and thus provide improved performance. In particular, a relaxation was applied that allows mappings in multiple dimensions of the convolution, including in the filter stencil. Relaxing the constraints means that more different cases need to be handled when generating code to implement the computation, but it is still feasible. In particular, the code generation was adapted to support fusion of multiple tensor dimension into one, and linearization of the data access of stencil computations. The latter involves replicating the access patterns produced by a stencil, like W[h+kh], explicitly in memory. While the unrolled dimension's new footprint is h'=h/stride*kh, the total number of operations to compute the result remains the same. To minimize created overhead, only the stencil dimensions that are necessary for an embedding were unrolled. To generate code for VTA, tensor splitting factors were used that are even divisors of the original dimension. Where an implementation without any padding is not possible, the reduction dimensions were automatically added to the next even divisor of the instruction size, if necessary.

In particular, memory layout transformations were implemented with Relay functions. The operator unrolling the stencil uses 'relay.take( )', a gather function taking an index list determining which values to copy, as no direct im2col operator is available in Relay.

The performance of the implementations generated according to the techniques was evaluated in terms of inference and memory transformation performance, as well as data footprint. Compared to the TVM reference implementation with padding, in many cases it is possible to improve memory footprint, operator performance, and/or overall performance. In some cases this involves trade-offs, and depending on which performance parameter is optimized for, different optimal implementations can be found. In particular, in many cases, effective hardware utilization, controlled by padding, was an important factor to improve performance, especially, in layers with ic=1: if ic<z then only ic/z·(h·w) elements in the input image meaningfully contribute to the result, driving down effective hardware utilization and making the presented technique particularly advantageous. Other situations where generated invocations performed particularly well is where padding creates weight tensors that exceed the capacity of the accelerator's weight buffer. Implementations generated with the provided techniques can avoid this, which can have the effect that the accelerator can hold the full weight tensor in the on-chip buffer. In such cases, particularly large performance speed-ups were found.

FIG. 6 shows a block-diagram of computer-implemented method 600 of implementing a computation using a hardware-accelerated instruction of a processor system. The method 600 may correspond to an operation of the system 100 of FIG. 1. However, this is not a limitation, in that the method 600 may also be performed using another system, apparatus or device.

The method 600 may comprise, in an operation titled "OBTAIN COMPUTATION DATA", obtaining 610 computation data. The computation data may define a computation data flow graph representing the computation. A node of the computation data flow graph represents an input or an operation of the computation.

The method 600 may comprise, in an operation titled "OBTAIN INSTRUCTION DATA", obtaining 620 instruction data. The instruction data may define an instruction data flow graph representing the hardware-accelerated instruction. A node of the instruction data flow graph may represent an input or an operation of the hardware-accelerated instruction.

The method 600 may comprise, in an operation titled "DEFINE INSTRUCTION->COMPUTATION CSP", based on the computation data and the instruction data, defining 630 a constraint satisfaction problem. A solution to the constraint satisfaction problem may represent a possible invocation of the hardware-accelerated instruction in the computation. The constraint satisfaction problem may assign nodes of the computation data flow graph to nodes of the instruction data flow graph. The constraint satisfaction problem may comprise one or more data flow constraints enforcing that the assigned nodes of the computation data flow graph have equivalent data flow to the instruction data flow graph. The constraint satisfaction problem may further comprise one or more input constraints restricting which nodes of the computation data flow graph can be assigned to the inputs of the hardware-accelerated instruction. These restrictions may be imposed by the hardware-accelerated instruction and/or its programming interface. The constraint satisfaction problem may comprise additional constraints.

The method 600 may comprise, in an operation titled "SOLVE CSP TO DETERMINE INVOCATION", solving 640 the constraint satisfaction problem to determine a possible invocation of the hardware-accelerated instruction in the computation. The method 600 may comprise, in an operation titled "OUTPUT INVOCATION", outputting 650 data defining the possible invocation.

It will be appreciated that, in general, the operations of method 600 of FIG. 6 may be performed in any suitable order, e.g., consecutively, simultaneously, or a combination thereof, subject to, where applicable, a particular order being necessitated, e.g., by input/output relations.

The method(s) may be implemented on a computer as a computer implemented method, as dedicated hardware, or as a combination of both. As also illustrated in FIG. 7, instructions for the computer, e.g., executable code, may be stored on a computer readable medium 700, e.g., in the form of a series 710 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 7 shows an optical disc 700.

Alternatively, the computer readable medium 700 may comprise transitory or non-transitory data 710 representing instructions which, when executed by a processor system supporting a hardware-accelerated instruction, e.g., system 200 of FIG. 2, cause the processor system to perform a computation, wherein said instructions invoke the hardware-accelerated instruction according to a possible invocation determined as described herein.

Furthermore, a computer-implemented method is envisioned that comprises, by a processor system supporting a hardware-accelerated instruction, executing instructions invoking the hardware-accelerated instruction according to a determined possible invocation.

Examples, embodiments or optional features, whether indicated as non-limiting or not, are not to be understood as limiting the invention.

It should be noted that the above-mentioned embodiments illustrate rather than limit the invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device described as including several means, several of these means may be embodied by one and the same item of hardware. The mere fact that certain measures are described mutually separately does not indicate that a combination of these measures cannot be used to advantage.

What is claimed is:

1. A computer-implemented method of implementing a computation using a hardware-accelerated instruction of a processor system, the method comprising the following steps:
obtaining computation data, wherein the computation data defines a computation data flow graph representing the computation, and each node of a plurality of nodes of the computation data flow graph represents an input or an operation of the computation;
obtaining instruction data, wherein the instruction data defines an instruction data flow graph representing the hardware-accelerated instruction that is accelerated by a hardware accelerator, and each node of a plurality of nodes of the instruction data flow graph represents an input or an operation of the hardware-accelerated instruction;
based on the computation data and the instruction data, defining a constraint satisfaction problem, wherein a solution to the constraint satisfaction problem represents an invocation of the hardware-accelerated instruction in the computation, wherein the constraint satisfaction problem assigns nodes of the computation data flow graph to nodes of the instruction data flow graph, and wherein the constraint satisfaction problem includes at least:
one or more constraints enforcing that the assigned nodes of the computation data flow graph have equivalent data flow to the instruction data flow graph,
one or more constraints restricting which nodes of the computation data flow graph can be assigned to the inputs of the hardware-accelerated instruction, wherein the constraints are imposed by the hardware-accelerated instruction and/or a programming interface of the hardware-accelerated instruction;
solving the constraint satisfaction problem to determine a solution corresponding to the invocation of the hardware-accelerated instruction in the computation, and outputting data defining the invocation.

2. The method of claim 1, further comprising:
generating machine-executable instructions implementing the computation, wherein the machine-executable instructions invoke the hardware-accelerated instruction according to the determined invocation.

3. The method of claim 1, wherein the operation of the computation and/or the operation of the hardware-accelerated instruction is a scalar operation.

4. The method of claim 3, wherein the hardware-accelerated instruction implements one or more of: a matrix multiplication or a convolution or a dot product or a matrix-vector product or a cumulative sum or a pooling or a Hadamard product.

5. The method of claim 4, wherein the computation includes applying one or more of a convolution, a matrix multiplication, and a pooling operation of a neural network layer.

6. The method of claim 1, wherein the instruction data flow graph includes nodes for only a subset of outputs of the hardware-accelerated instruction, and the method further comprises inferring from the invocation a mapping of further outputs of the hardware-accelerated instruction to operations of the computation.

7. The method of claim 1, wherein the computation data includes a polyhedral representation symbolically defining a set of nodes of the computation data flow graph, and wherein the solving of the constraint satisfaction problem includes instantiating the polyhedral representation to obtain a node of the set of nodes and mapping a node of the instruction data flow graph to the obtained node.

8. The method of claim 1, wherein the method further comprises defining one or more constraints to enforce that inputs of the hardware-accelerated instruction have an allowed memory layout and/or memory access pattern.

9. The method of claim 1, wherein the method further comprises defining one or more constraints to enforce that pairs of mutually parallelizable operations of the hardware-accelerated instruction are mapped to pairs of mutually parallelizable operations of the computation.

10. The method of claim 1, wherein a node of the instruction data flow graph represents a commutative reduction operation, and wherein the method further comprises defining one or more constraints to enforce that the node representing the commutative reduction operation is mapped to a corresponding node of the computation data flow graph.

11. The method of claim 1, wherein the method further comprises defining the constraint satisfaction problem to allow mapping of operations of the hardware-accelerated instruction to dummy operations that do not affect the computation.

12. The method of claim 1, wherein the method further comprises including in the constraint satisfaction problem one or more constraints enforcing inputs of the hardware-accelerated instruction to form a hyper-rectangle.

13. The method of claim 1, further comprising:
   determining a finite number of multiple solutions to the constraint satisfaction problem;
   evaluating performance of the multiple solutions; and
   selecting a solution from the multiple solutions based on the performance evaluation.

14. The method of claim 1, wherein the hardware accelerator is separate from a CPU of the processing system, and wherein the hardware accelerator includes one of a coprocessor, an application-specific instruction set processor (ASIP), a field-programmable gate array (FPGA), an application-specific integrated circuit (ASIC), or a complex programmable logic device (CPLD).

15. A system for implementing a computation using a hardware-accelerated instruction of a processor system, the system comprising:
   a data interface configured to access computation data and instruction data, wherein the computation data defines a computation data flow graph representing the computation, wherein each node of a plurality of nodes of the computation data flow graph represents an input or an operation of the computation, and wherein the instruction data defines an instruction data flow graph representing the hardware-accelerated instruction that is accelerated by a hardware accelerator, wherein each node of a plurality of nodes of the instruction data flow graph represents an input or an operation of the hardware-accelerated instruction;
   a processor subsystem configured to:
      obtain the computation data and the instruction data,
      based on the computation data and the instruction data, define a constraint satisfaction problem, wherein a solution to the constraint satisfaction problem represents an invocation of the hardware-accelerated instruction in the computation, wherein the constraint satisfaction problem assigns nodes of the computation data flow graph to nodes of the instruction data flow graph, and wherein the constraint satisfaction problem includes at least:
         one or more constraints enforcing that the assigned nodes of the computation data flow graph have equivalent data flow to the instruction data flow graph,
         one or more constraints restricting which nodes of the computation data flow graph can be assigned to the inputs of the hardware-accelerated instruction, wherein the constraints are imposed by the hardware-accelerated instruction and/or its programming interface;
      solve the constraint satisfaction problem to determine the invocation of the hardware-accelerated instruction in the computation, and output data defining the invocation.

16. The system of claim 15, wherein the hardware accelerator is separate from a CPU of the processing system, and wherein the hardware accelerator includes one of a coprocessor, an application-specific instruction set processor (ASIP), a field-programmable gate array (FPGA), an application-specific integrated circuit (ASIC), or a complex programmable logic device (CPLD).

17. A non-transitory computer-readable medium on which is stored a computer program for implementing a computation using a hardware-accelerated instruction of a processor system, the computer program, when executed by a computer, causing the computer to perform the following steps:
   obtaining computation data, wherein the computation data defines a computation data flow graph representing the computation, and each node of a plurality of nodes of the computation data flow graph represents an input or an operation of the computation;
   obtaining instruction data, wherein the instruction data defines an instruction data flow graph representing the hardware-accelerated instruction that is accelerated by a hardware accelerator, and each node of a plurality of nodes of the instruction data flow graph represents an input or an operation of the hardware-accelerated instruction;
   based on the computation data and the instruction data, defining a constraint satisfaction problem,
   wherein a solution to the constraint satisfaction problem represents an invocation of the hardware-accelerated instruction in the computation, wherein the constraint satisfaction problem assigns nodes of the computation data flow graph to nodes of the instruction data flow graph, and wherein the constraint satisfaction problem includes at least:
      one or more constraints enforcing that the assigned nodes of the computation data flow graph have equivalent data flow to the instruction data flow graph,
      one or more constraints restricting which nodes of the computation data flow graph can be assigned to the inputs of the hardware-accelerated instruction, wherein the constraints are imposed by the hardware-accelerated instruction and/or a programming interface of the hardware-accelerated instruction;
   solving the constraint satisfaction problem to determine a solution corresponding to the possible invocation of the hardware-accelerated instruction in the computation, and outputting data defining the invocation.

18. The non-transitory computer-readable medium of claim 17, wherein the hardware accelerator is separate from a CPU of the processing system, and wherein the hardware accelerator includes one of a coprocessor, an application-specific instruction set processor (ASIP), a field-programmable gate array (FPGA), an application-specific integrated circuit (ASIC), or a complex programmable logic device (CPLD).

* * * * *